(12) United States Patent
Mori

(10) Patent No.: US 8,559,034 B2
(45) Date of Patent: Oct. 15, 2013

(54) IMAGE FORMING APPARATUS AND PREVIEW DISPLAY METHOD

(75) Inventor: Nami Mori, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 680 days.

(21) Appl. No.: 12/460,588

(22) Filed: Jul. 21, 2009

(65) Prior Publication Data
US 2010/0027055 A1 Feb. 4, 2010

(30) Foreign Application Priority Data
Jul. 30, 2008 (JP) .................. 2008-196791

(51) Int. Cl.
*G06F 3/12* (2006.01)
(52) U.S. Cl.
USPC ........... 358/1.15; 358/1.2; 358/451; 358/528; 382/276; 382/298; 715/273; 715/274
(58) Field of Classification Search
USPC ......... 358/1.2, 1.15, 451, 528, 1.18, 1.9, 400; 382/276, 298; 715/273, 274, 773, 855
See application file for complete search history.

(56) References Cited

U.S. PATENT DOCUMENTS

| | | | |
|---|---|---|---|
| 2001/0026699 A1* | 10/2001 | Ishikura | 399/81 |
| 2003/0030846 A1 | 2/2003 | Mori et al. | |
| 2005/0047659 A1 | 3/2005 | Tanaka | |
| 2008/0030523 A1 | 2/2008 | Takami et al. | |
| 2008/0144090 A1* | 6/2008 | Kimura et al. | 358/1.15 |
| 2008/0309956 A1* | 12/2008 | Yano et al. | 358/1.9 |

FOREIGN PATENT DOCUMENTS

| | | | |
|---|---|---|---|
| JP | 2003-032404 A | | 1/2003 |
| JP | 2004140420 A | | 5/2004 |
| JP | 2005-073015 | | 3/2005 |
| JP | 2005-311947 | | 11/2005 |
| JP | 2006246284 A | * | 9/2006 |
| JP | 2007074149 A | * | 3/2007 |
| JP | 2008-042417 A | | 2/2008 |

OTHER PUBLICATIONS

Amendment dated Sep. 18, 2008, for corresponding Chinese Patent Application No. 200910160232.2.

* cited by examiner

*Primary Examiner* — Jacky X Zheng
(74) *Attorney, Agent, or Firm* — Edwards Wildman Palmer LLP; David G. Conlin; Steven M. Jensen

(57) ABSTRACT

An image forming apparatus is provided that is capable of, in displaying a preview of image data to be output, confirming a confirmation point in accordance with an operation mode immediately without performing a user operation such as enlarging, reducing or shifting. The image processing apparatus (illustrated as a digital multi-functional peripheral) is capable of operating in each of a plurality of operation modes. The image forming apparatus is provided with an image display portion such as a touch panel for displaying a preview of image data and a set value storage portion such as control memory for storing a display set value in displaying a preview image at first on the image display portion for each operation mode.

13 Claims, 11 Drawing Sheets

IMAGE FORMING APPARATUS AND PREVIEW DISPLAY METHOD

CROSS-NOTING PARAGRAPH

This non-provisional application claims priority under 35 U.S.C. §119 (a) on Patent Application No. 2008-196791 filed in JAPAN on Jul. 30, 2008, the entire contents of which are hereby incorporated herein by reference.

FIELD OF THE INVENTION

The present invention relates to an image forming apparatus and a preview display method capable of displaying a preview of image data before outputting.

BACKGROUND OF THE INVENTION

Conventionally, some image forming apparatuses such as multi-functional peripherals have a function of displaying a preview of image data that is the object of the output to be printed or sent.

Japanese Laid-Open Patent Publication No. 2005-73015 discloses a technique which determines whether image data displayed for previewing is a character image or a gradation image, and when it is a character image, displays the image by setting a preview magnification as to be enough to recognize the characters.

However, when a final state of image formation is confirmed by a preview display, a confirmation point considered as important is generally different depending on an operation mode. More specifically, in the case of a copy mode, considered as important is the visibility of the entire image, a position relationship between staple or punch and a printing position of the image data, including whether the printing position of image data and the stapling or punching position are not overlapped, or the like. Further, in sending data such as facsimile sending, considered as important is presence or absence of an erroneous setting of a covering letter, sending source information or sending destination information to be added to header, or the like. Further, in a filing mode in which image data is filed inside, an arrangement relationship between the image data and additional information to be added in filing, or the like is considered as important.

The visual confirmation point to be considered as important is different depending on an operation mode in this manner, and it is necessary to enlarge, reduce, or shift image data displayed for previewing by a user operation in order to confirm the visual confirmation point in accordance with the operation mode.

In addition, although the technique described in Japanese Laid-Open Patent Publication No. 2005-73015 is to differentiate conditions in a preview after determining characteristics of an image to differentiate a display form according to characteristics of the image but not to variably set a form of a preview display in accordance with an operation mode or a display form desired by a user.

SUMMARY OF THE INVENTION

An object of the present invention is to provide an image forming apparatus and a preview display method capable of, in displaying a preview of image data to be output, confirming a confirmation point in accordance with an operation mode immediately without performing a user operation such as enlarging, reducing, or shifting.

Another object of the present invention is to provide an image forming apparatus capable of operating in each of a plurality of operation modes, comprising: an image display portion that displays a preview image of image data to be output; and a set value storage portion that stores a display set value when the preview image is displayed at first on the image display portion for each of the operation modes.

Another object of the present invention is to provide the image forming apparatus, wherein the preview image is an image generated by reducing the image data to be output.

Another object of the present invention is to provide the image forming apparatus, wherein the preview image is an image in which the image data to be output is sequentially displayed in the unit of a page to be output.

Another object of the present invention is to provide the image forming apparatus, wherein a copy mode in which image data obtained by reading an original image is printed is included as one of the plurality of operation modes, and the display set value for the copy mode includes a setting by which a display size of the preview image is such a size that the entire page is viewable.

Another object of the present invention is to provide the image forming apparatus, wherein the display set value for the copy mode includes a setting by which the image display portion displays the preview image including a finish state in outputting.

Another object of the present invention is to provide the image forming apparatus, wherein the finish state is a state after any one or more of stapling, punching, combination, and booklet stapling.

Another object of the present invention is to provide the image forming apparatus, wherein a copy mode in which image data obtained by reading an original image is printed is included as one of the plurality of operation modes, and the display set value for the copy mode includes a setting by which additional information to be added to the image data in printing is displayed at a substantially intermediate position between an upper end and a lower end of a screen of the image display portion.

Another object of the present invention is to provide the image forming apparatus, wherein a data send mode in which image data is sent to an outside is included as one of the plurality of operation modes, and the display set value for the data send mode includes a setting by which a covering letter to be attached in sending to the outside or header information to be added to image data sent to the outside is displayed in a viewable size.

Another object of the present invention is to provide the image forming apparatus, wherein a filing mode in which image data is stored in a storage apparatus provided inside the image forming apparatus is included as one of the plurality of operation modes, and the display set value for the filing mode includes a setting by which additional information to be added to the image data in storing is displayed at a substantially intermediate position between an upper end and a lower end of the screen of the image display portion.

Another object of the present invention is to provide the image forming apparatus, wherein the display set value includes a setting by which a display magnification of the preview image of the image data to be output is differentiated in accordance with the operation modes.

Another object of the present invention is to provide the image forming apparatus, wherein a set value changing portion is included for changing the display set value in accordance with the operation modes by a user operation.

Another object of the present invention is to provide the image forming apparatus, wherein a user authenticating portion for authenticating a user is included, the set value storage portion is capable of storing the display set value in accordance with the operation modes for each user authenticated by the user authenticating portion, and the set value changing portion is capable of changing the display set value in accordance with the operation modes for each user authenticated by the user authenticating portion.

Another object of the present invention is to provide a preview display method in an image forming apparatus capable of operating in each of a plurality of operation modes, wherein the image forming apparatus includes a set value storage portion that stores a display set value in first displaying a preview image for each of the operation modes and an image display portion, and the preview image display method comprising: a step of reading the display set value corresponding to a current operation mode from the set value storage portion; and a step of displaying a preview image of image data to be output on the image display portion according to the read display set value.

PREFERRED EMBODIMENTS OF THE INVENTION

Now, a preferred embodiment of the present invention will hereinafter be described with reference to the drawings. An embodiment in which an image forming apparatus according to the present invention is applied to a digital multi-functional peripheral having a print function, a copy function, and a facsimile sending and receiving function, etc., will hereinafter be described specifically with reference to the drawings showing the embodiment.

<Apparatus Configuration>

Figure 1:
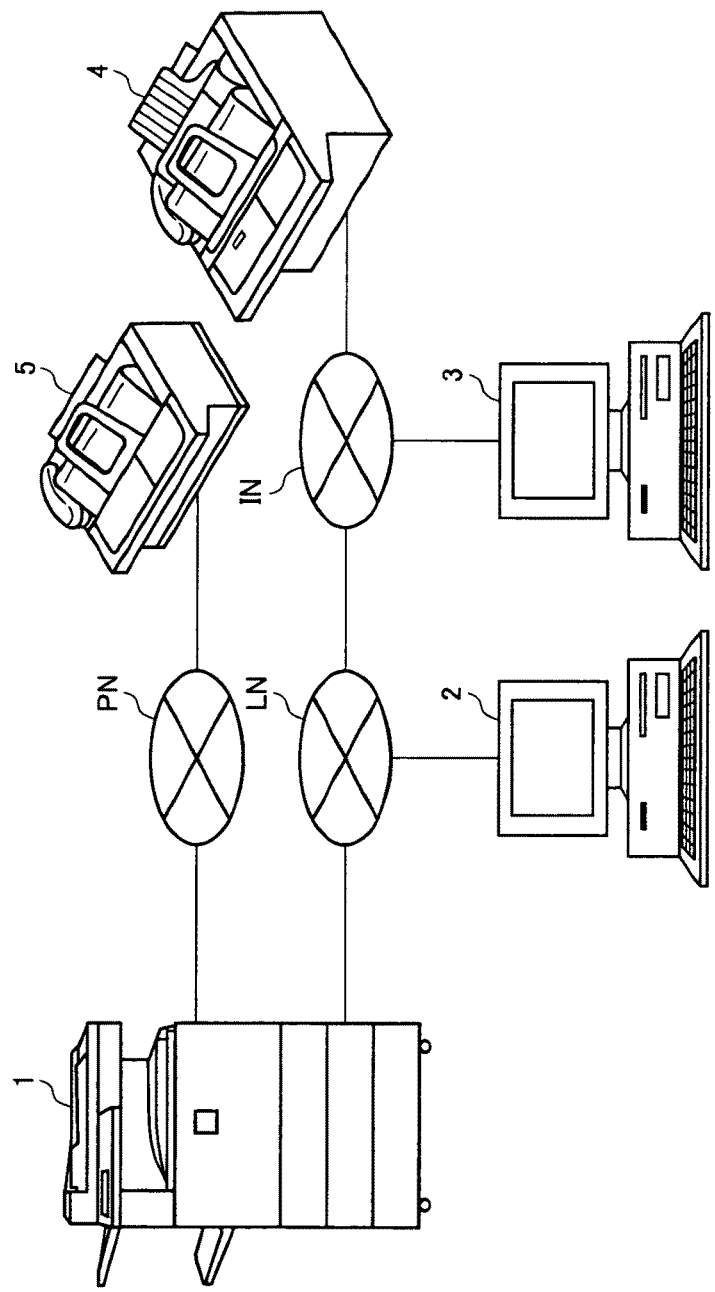
FIG. 1 is a schematic diagram for showing an exemplary configuration of an image processing system constructed by using a digital multi-functional peripheral as an example of an image forming apparatus according to an embodiment of the present invention.

FIG. 1 is a schematic diagram for showing an exemplary configuration of an image processing system constructed by using a digital multi-functional peripheral as an example of an image forming apparatus according to an embodiment of the present invention. In FIG. 1, 1 denotes a digital multi-functional peripheral, 2 and 3 denote external computers, 4 denotes an internet facsimile apparatus (internet FAX apparatus), and 5 denotes a facsimile apparatus.

The digital multi-functional peripheral 1 has a print function and a copy function, as well as a function of sending and receiving image data by facsimile (facsimile function) and/or a function of sending and receiving image data by internet FAX (internet FAX function). This digital multi-functional peripheral 1 is connected to various external devices through a communication network. For example, an external computer 2 such as a personal computer (PC) is connected to a communication network LN that is laid as a local communication network, and an external computer 3 and an internet FAX apparatus 4 are connected to an internet network IN that is connected through a gateway not shown in the figure, or the like. Further, an external facsimile apparatus 5 is connected through a public switched telephone network PN. Note that, as described above, although description will be given only for the case where the image forming apparatus according to the present invention is applied to the digital multi-functional peripheral 1, the internet FAX apparatus 4 and the facsimile apparatus 5 are also applicable as the image forming apparatus according to the present invention.

Figure 2:
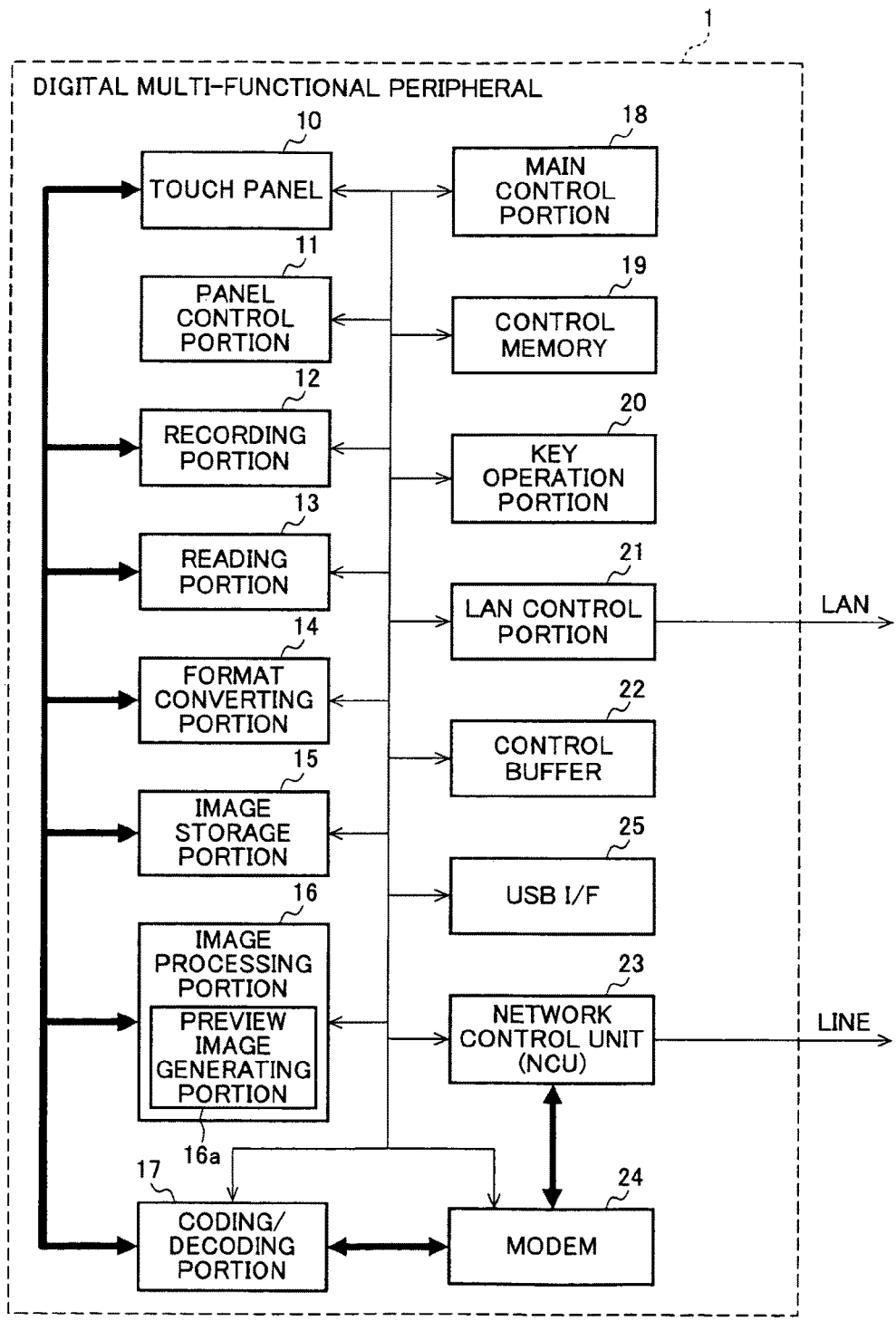
FIG. 2 is a schematic block diagram for showing an exemplary configuration of the digital multi-functional peripheral of FIG. 1.
Figure 3:
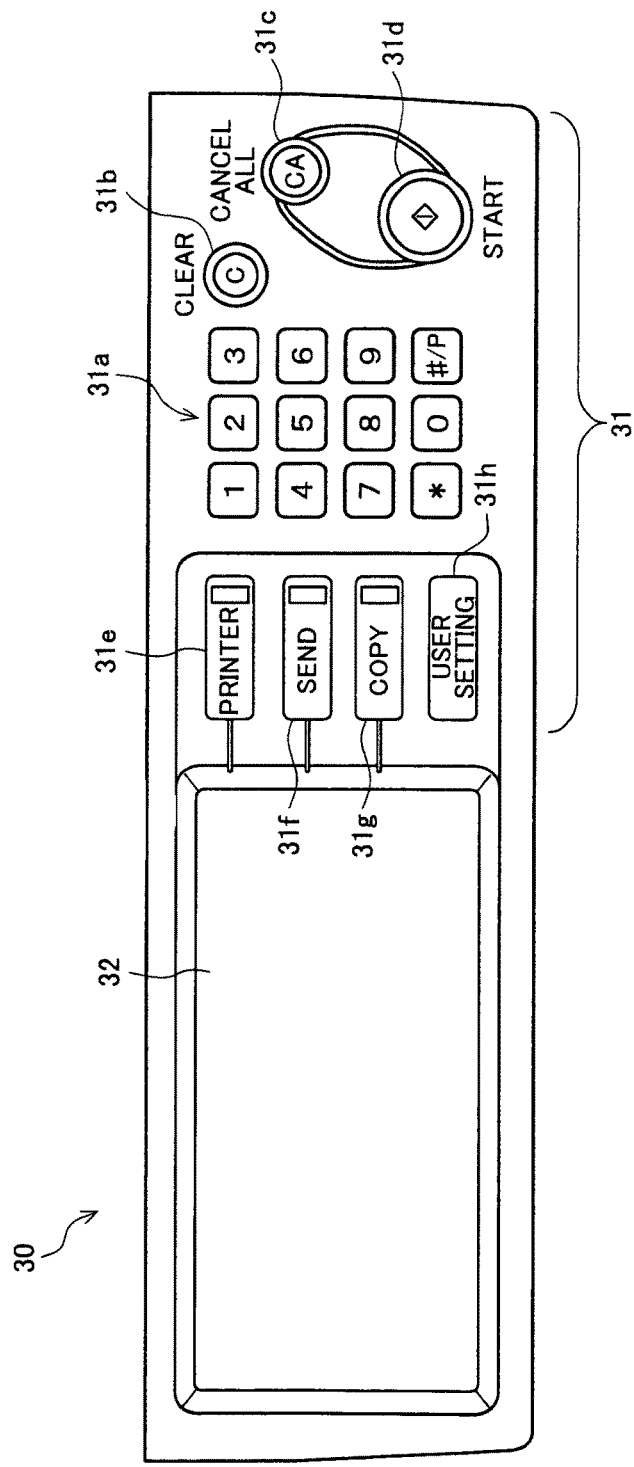
FIG. 3 is an external view for showing an example of a touch panel and a key operation portion in the digital multi-functional peripheral of FIG. 2.

Description will be given for a configuration and an operation of the digital multi-functional peripheral 1. FIG. 2 is a schematic block diagram for showing an exemplary configuration of the digital multi-functional peripheral of FIG. 1, and FIG. 3 is an external view for showing an example of a touch panel and a key operation portion of the digital multi-functional peripheral of FIG. 2.

The digital multi-functional peripheral 1 illustrated in FIG. 2 is provided with a touch panel 10, a panel control portion 11, a recording portion 12, a reading portion 13, a format converting portion 14, an image storage portion 15, an image processing portion 16, a coding/decoding portion 17, a main control portion 18, a control memory 19, a key operation portion 20, a LAN (Local Area Network) control portion 21, a control buffer 22, a network control unit (NCU) 23, a modem 24, and a USB (Universal Serial Bus) interface (I/F) 25. In addition, the digital multi-functional peripheral 1 may be provided with a post processing apparatus that performs the punching and the stapling, and description will hereinafter be given with reference to an embodiment provided with the post processing apparatus.

The main control portion 18 is comprised of a CPU (Central Processing Unit), a DSP (Digital Signal Processor), or the like. The control memory 19 is comprised of a nonvolatile memory or the like, such as a ROM (Read Only Memory) or an EEPROM (Electrically Erasable and Programmable ROM). A program (firmware) and various setting data are stored in the control memory 19 so as to be readable from the main control portion 18. Among them, at least the various setting data is stored in a rewritable memory. The program and the various setting data may be stored in hard disc as an exemplary configuration of the image storage portion 15, which will be described below. The control buffer 22 is comprised of a volatile memory such as a RAM (Random Access Memory).

The above-described program is used for the main control portion 18 to carry out a command concerning generation and display of a preview image, which will be described below, according to the present invention, a command concerning generation/sending/reception, etc., of a facsimile image and an electronic mail, etc., a command concerning reading of an original, a command concerning printing, a command concerning reading and printing (that is, copying) of an original, and the like, with respect to other parts. This program is expanded by the main control portion 18 on the control buffer 22 and is executed by referring to various setting data including a display set value, which will be described below, appropriating the control buffer 22 as a data area for temporal storing (working).

The reading portion 13 reads an original as a bitmap image of RGB (R: Red, G: Green, and B: Blue) with a predetermined resolution by a scanner using a CCD (Charge Coupled Device) and outputs the read RGB image data (dot image data) to the image processing portion 16. The image processing portion 16 is comprised of an ASIC (Application Specific Integrated Circuit) or the like, and applies various image processing to target image data. An example of the image processing will be described below. The ASIC may be incorporated with other parts such as the coding/decoding portion 17.

The image storage portion 15 is comprised of hard disc or the like, and stores image data that has been read by the reading portion 13 and has passed through the image processing portion 16, image data that has been received from outside through the LAN control portion 21, the NCU 23, etc., and the like. When image data is stored in the image storage portion 15, data that has been coded by the coding/decoding portion 17 may be also stored. Moreover, the image storage portion 15 may temporarily save intermediate data generated during image processing at the image processing portion 16.

The coding/decoding portion 17 compresses image data by coding and decodes (expands) the coded image data to original image data. For example, the coding/decoding portion 17 performs coding of image data read from an original, decoding of the coded data, decoding of coded image data received from outside, and the like. In the coding/decoding portion 17, coding systems corresponding to purposes are usable, including JPEG (Joint Photographic Experts Group) that is generally used in filing, and MH (Modified Huffman), MR (Modified READ) and MMR (Modified Modified READ) that are generally used in facsimile communication. As the coding system, MH is employable in IP facsimile communication, and JPEG and JBIG (Joint Bi-level Image Experts Group) as well as MH, MR, and MMR are employable in internet facsimile communication.

The format converting portion 14 converts read image data or image data received from outside into a predetermined file format such as a PDF (Portable Document Format), a GIF (Graphics Interchange Format), or a TIFF (Tag Image File Format).

The recording portion 12 is provided with a printer apparatus that employs a printing system such as an electrophotographic system or an inkjet system, and records (that is, prints) image data and the like stored in the image storage portion 15 on recording paper. The USB I/F 25 is an I/F for connecting to a USB device such as a USB memory, and outputs image data and the like after original reading that is stored in the image storage portion 15 to the USB device or reads a file from the USB device.

The modem 24 is comprised of a facsimile modem capable of facsimile communication, and is connected to a telephone line and is directly connected to the NCU 23. The NCU 23 is connected to the telephone line to control the line. That is, the NCU 23 is a hardware that performs an operation of closing and opening the line with an analogue public switched telephone network (PSTN), and connects the modem 24 to the public switched telephone network as the occasion demands. Such a configuration enables to send image data stored in the image storage portion 15 to outside by facsimile, to receive facsimile image data from the telephone line to store in the image storage portion 15, or to print by the recording portion 12 directly.

The LAN control portion 21 is connected to a LAN and performs communication of electronic mail data and communication of internet FAX via an internet. The internet FAX uses a LAN interface or the like to send and receive an electronic mail through a computer network such as a LAN.

The touch panel 10 or the key operation portion 20 receives an operation for selecting desired processing out of processing of reading an original, processing of sending and printing image data, etc., an operation for staring the processing, an operation for performing a setting that is necessary when each processing is executed (a selecting operation or an inputting operation), and the like. Various examples of the setting include a setting of the number of printed sheets in printing, a setting of punching and stapling and a setting of destination information in sending a facsimile image or an electronic mail.

The key operation portion 20 is provided with a key group necessary for operations. The touch panel 10 has a display portion and an operation receiving portion such as a touch sensor. The touch panel 10 is subjected to display control and operation reception control by the panel control portion 11. That is, the panel control portion 11 performs the display control for the display portion and the operation reception control for the operation receiving portion in the touch panel 10.

On the display portion of the touch panel 10, a current operating state, setting information (for example, sending destination, etc.), and the like are displayed. The display is realized when the panel control portion 11 performs control to display a GUI (Graphical User Interface) image. The GUI enables to change the display and an operation received position depending on a user operation. Each GUI and an image thereof may be stored so as to be readable in an internal memory of the panel control portion 11 or the control memory 19. In addition, as the display portion, display devices in various display systems including liquid crystal displays and organic EL (Electroluminescence) displays are employable.

The user operation received on the touch panel 10 is interpreted by the panel control portion 11 and is transmitted as an operation signal to the main control portion 18. The user operation received by the key operation portion 20 is interpreted by the key operation portion 20 itself and transmitted as an operation signal to the main control portion 18. The main control portion 18 issues a command in accordance with the operation signal obtained in this manner to other parts to cause the other parts to execute processing in accordance with the user operation. Note that, although description has been given with reference to the touch panel 10 in which the display device and the operation portion are integrated, only the display apparatus may be simply provided instead of the touch panel 10 and, in that case, where the user operation is received only by the key operation portion 20.

The touch panel 10 and the key operation portion 20 may be configured as an operation panel 30 as illustrated in FIG. 3, and the operation panel 30 is comprised of a key operation portion 31 (corresponding to the key operation portion 20) provided with various hardware keys and a touch panel 32

(corresponding to the touch panel 10) comprised of a liquid crystal display and a touch sensor. The present invention will hereinafter be described in detail with the touch panel 32 and the key operation portion 31 applied in the configuration of FIG. 1 instead of the touch panel 10 and the key operation portion 20.

The key operation portion 31 is provided with, as hardware keys, a numeric keypad 31a for inputting numeric values, a clear key 31b for clearing input set values, a cancel all key 31c for canceling all of various input settings, and a start key 31d for receiving instructions of start of copying, start of sending, etc., as well as function switch keys 31e, 31f, and 31g for switching a print function, a sending function and a copy function, and a system setting key 31h for receiving a setting by a user.

An exemplary operation in the digital multi-functional peripheral 1 having the above-described exemplary configuration will be described.

<Original Reading Operation>

An original reading operation is performed when image data of a read original is stored (filed) in the image storage portion 15, when image data of a read original is sent to outside, when image data of a read original is printed (that is, copied), and the like.

When a user operation to perform processing requiring original reading is received by the operation panel 30, the main control portion 18 gives an instruction to the reading portion 13, the image storage portion 15, the image processing portion 16, the coding/decoding portion 17, and the like to execute processing as will be described below.

The reading portion 13 optically reads an image of an original placed on a document platen or an automatic document feeder and provides the image processing portion 16 with RGB image data (bitmap data of RGB) as a result of reading. The image processing portion 16 executes various image processing (hereinafter, referred to as original image processing) such as A/D conversion, shading correction, and γ correction for the RGB image data. Here, the shading processing is processing to remove various distortions generated in an illumination system, an image focusing system, and an image sensing system of the reading portion 13.

As the original image processing, original determination processing and segmentation processing may be executed subsequently to the A/D conversion, the shading correction, and the γ correction. The original determination processing includes processing of determining a type of the original and processing of determining whether the original is a color original or a monochromatic original based on input image data (image data after the application of the γ correction in this case). Examples of the type of the original include a text original, a printed photograph original, and text and printed photograph original in combination thereof. The image processing portion 16 outputs a determination signal (hereinafter, referred to as original determination data) as a result of the original type determination processing and the monochromatic/color original determination processing. The segmentation processing is processing of determining to what kind of area each pixel of the input image data (image data after the application of the γ correction in this case) belongs, and an example thereof includes processing of determining to which area including a black text area, a color text area and a halftone area each pixel belongs. The image processing portion 16 outputs segmentation data as a result of the determination. Note that, the segmentation processing may be executed based on the result of the above-described original determination processing and monochromatic/color original determination processing.

The original determination data and the segmentation data are stored in the image storage portion 15 in association with corresponding image data (image data after the application of the original image processing). At this time, the original determination data and the segmentation data are coded by the coding/decoding portion 17 and each coded data is thereafter stored in the image storage portion 15 in association with the corresponding image data. Note that, although the coding in storing in the image storage portion 15 is not essential, description will be given assuming that the image data is stored in a state of being coded. This is also the same in operations other than the original reading operation.

<Printing Operation>

By the above-described original reading operation, processing up to filing of the image data of the read original is completed. Next, description will be given for a printing operation when the image data of the read original is printed (that is, when the original is copied). When the user operation to perform processing that requires printing is received by the operation panel 30, the main control portion 18 gives an instruction to the recording portion 12, the image storage portion 15, the image processing portion 16, the coding/decoding portion 17, and the like to execute processing as will be described below. Note that, the main control portion 18 also gives an instruction to the reading portion 13 (original reading instruction), for example, when a copy operation is performed.

The digital multi-functional peripheral 1 is also capable of adding additional information such as a fixed stamp, date (or date and time), and a page number to image data in printing, and when such an adding instruction is given, the main control portion 18 controls the image processing portion 16. It can be said that the additional information added to the image data is an additional image. The additional information is stored in the control memory 19 and is read out as the occasion demands. Of course, the additional information may be originally stored as data of the additional image. In addition, it is recommendable that a plurality of additional information may be stored in the control memory 19 and additional setting information may be stored in the control memory 19. The additional setting information includes at least information showing a position to add to the image data (hereinafter, referred to as an adding position), and when a plurality of additional information is stored, information that indicates any of which is to be selected is also included. Moreover, when an instruction to execute the punching or the stapling by the post processing apparatus is given, the main control portion 18 also controls the post processing apparatus.

The coding/decoding portion 17 reads and decodes image data to be printed and original determination data and segmentation data corresponding thereto from the image storage portion 15, and gives the decoded image data to the image processing portion 16. The image processing portion 16 executes various image processing (hereinafter, referred to as image processing for printing) for the decoded image data (RGB image data). As will be schematically described below, examples of the image processing for printing include image quality adjustment processing, two-color processing, color correction processing, black generation and under color removal processing, spatial filter processing, scaling processing, output tone correction processing, and halftone generation processing. The black generation and under color removal processing, the spatial filter processing, and the halftone generation processing are processing in accordance with various areas indicated by the segmentation data.

As the image quality adjustment processing, a background is detected from the decoded image data to perform background removal. Moreover, as the image quality adjustment processing, RGB adjustment (color adjustment; entire color adjustment of redness or blueness), brightness adjustment, and vividness adjustment are also performed for the image data after the application of the background removal based on setting information set by a user from the operation panel 30. At this time, adjustment in accordance with an original type indicated by the original determination data may be performed.

As the color correction processing, CMY data having components of CMY (C: Cyan, M: Magenta, Y: Yellow) which are complementary colors of RGB is generated from the RGB data after the application of the image quality adjustment processing and the processing of enhancing color reproduction is performed. As the black generation and under color removal processing, black generation processing of generating black (K) data from the CMY data after the application of the color correction and under color removal processing of subtracting the K data obtained by the black generation from the original CMY data to generate new CMY data. As the spatial filter processing, enhancement processing or smoothing processing is performed for CMYK data which is data of the four colors. When a two-color mode for outputting the image data in two colors (for example, red and black) is selected, the two-color processing is performed. As the two-color processing, processing of converting the RGB data into CMY data that represents specified two colors (red and black in this case) is performed. In the case of the two-color mode, the black generation and under color removal processing is executed for the CMY data after the application of the two-color processing and the spatial filter processing is also executed, however, the color correction processing is not performed.

As the scaling processing, image enlarging processing or image reducing processing is performed for the CMYK data after the application of the spatial filter processing based on a printing copy ratio set by the user operation from the operation panel 30. The printing copy ratio is a copy ratio of a printed image for the image indicated by read and stored image data. Of course, the printing copy ratio is not limited to a copy ratio obtained by the user operation and is a copy ratio set as default when no operation is performed for the printing copy ratio. As the output tone correction processing, output γ correction processing of outputting to a recording medium such as recording paper is performed for the CMYK data. As the halftone generation processing, tone reproduction processing of outputting an image by error diffusion processing and dither processing is performed for the CMYK data after the application of the output tone correction processing. In the output tone correction processing and the halftone generation processing, the processing in accordance with an original type indicated by the original determination data may be performed, for example, including differentiating processing contents between a text area and other areas.

The CMYK data after the application of the halftone generation processing is provided to the recording portion 12. Description will be given for the case where additional information is added. There are a method for applying the scaling processing also to the additional information in accordance with a magnification of print data and a method for not applying the scaling processing to the additional information regardless of a magnification of print data. First, when the scaling processing is also performed for the additional information, the main control portion 18 reads the additional information and information showing an adding position, the main control portion 18 or the image processing portion 16 converts into image data as the occasion demands, and the image data of the additional information is provided to the image processing portion 16 before the scaling processing. Note that, the conversion is not necessary when additional image data is originally stored. Subsequently, the image processing portion 16 may synthesize the image data of the additional information and image data of an addition destination that is image data before the scaling processing at the above-described adding position.

When the scaling processing is not performed for the additional information, the main control portion 18 reads the additional information and information showing an adding position, and the main control portion 18 or the image processing portion 16 converts into image data as the occasion demands. In this example, CMYK data is obtained by the conversion. Note that, the conversion is not necessary when additional image data is originally stored. Subsequently, the image processing portion 16 may synthesize the image data of the additional information and image data of an addition destination that is image data after the application of the scaling processing (the above-described CMYK data to which the output tone correction processing or the halftone generation processing is applied) at the above-described adding position.

In either case, it is possible to output CMYK data after the application of the halftone generation processing with the additional information added thereto by the image processing portion 16. Note that, in the digital multi-functional peripheral 1, additional information and an adding position thereof are able to be set by the user using the operation panel while performing a preview display described below.

The recording portion 12 receives the image data to which the image processing for printing has been given by the image processing portion 16 in this manner (CMYK image data in this example) and generates a hard copy (prints out) by an electrophotographic system, an inkjet system, or the like. Then, the post processing apparatus executes the punching or the stapling for printed sheets as the occasion demands. Note that, the data targeted for the printing operation described here is not limited to the image data read by the reading portion 13, and, for example, image data (image file) that has been previously transferred from an external recording medium such as a USB memory, a PC connected through a network, or the like and stored in the image storage portion 15 is also applicable in the same manner. The printing operation for the image data that has been received by facsimile and stored in the image storage portion 15 will be described below.

<Preview Display Operation for Image Data to be Printed>

Next, description will be given for an operation of displaying a preview of image data stored in the image storage portion 15 as a result of original reading on the touch panel 32 before printing (preview display operation). The digital multi-functional peripheral 1 is configured so as to allow image data to be printed to be displayed for previewing (thumbnail display). The preview display operation is performed when the user operation to perform processing that requires the preview display is received by the operation panel 30. For example, the preview display operation is also performed when a setting is made such that a preview of the image data after the original reading is firstly displayed before executing printing. For example, at the time when a setting for performing the preview display is performed and copy conditions are then set to depress the start key, the original reading may be started and a preview image may be displayed on the touch panel 32 after the reading.

The main control portion 18 gives an instruction to the image storage portion 15, the image processing portion 16, the coding/decoding portion 17, the panel control portion 11, and the like to execute processing as will be described below. Note that, the main control portion 18 also gives an instruction to the reading portion 13 (original reading instruction), for example, when an operation of copying an original is performed.

The coding/decoding portion 17 reads and decodes image data to be displayed for previewing and original determination data and segmentation data corresponding thereto from the image storage portion 15, and gives the decoded data to the image processing portion 16. The image processing portion 16 executes various image processing (hereinafter, referred to as image processing for previewing) for the decoded image data (RGB image data). As will be schematically described below, examples of the image processing for previewing include image quality adjustment processing, two-color processing, color correction processing, spatial filter processing, scaling processing, and output tone correction processing. The spatial filter processing and the output tone correction processing are processing in accordance with various areas indicated by the segmentation data.

The image quality adjustment processing here is the same as the image quality adjustment processing in the image processing for printing. As the color correction processing, processing of converting the image data after the application of the image quality adjustment processing (RGB data) into R'G'B' data based on display characteristics of the touch panel 32. As the spatial filter processing, enhancement processing or smoothing processing is performed for the R'G'B' data.

As the scaling processing, image enlarging processing/image reducing processing in accordance with a print magnification is performed for R'G'B' data after the application of the spatial filter processing, and further processing for converting the number of pixels of the R'G'B' data into the number of pixels (display resolution) of the touch panel 32 is performed and the image enlarging processing or image reducing processing is performed based on a preview display magnification shown by a "display set value for a copy mode" stored in the control memory 19 at the same time. The display set value here indicates an initial value of a preview display setting that is set for each operation mode, that is, a value of a display setting when a preview image is displayed first. Used here is the display set value for a copy mode in which image data obtained by reading an original image by the reading portion 13 is printed by the recording portion 12. Note that, the preview display magnification is a magnification, for example, such as twice or four times, and is a magnification of an image in the preview display.

A preview image generating portion 16a provided in the image processing portion 16 generates an image for the preview display (preview image) mainly by such scaling processing for the preview display.

Description will be given for a preview image when additional information is added. As described above, the digital multi-functional peripheral 1 is capable of outputting image data to be output with additional information added thereto, and the preview display is executed when the panel control portion 11 performs control to display an image showing the additional information. Thus, the preview image generating portion 16a generates such an image showing the additional information and synthesizes it and the preview image generated from the image data to be output to generate a preview image with the additional information. The panel control portion 11 causes the touch panel 32 to display the preview image.

The additional information is able to be output with image data to be printed by performing the scaling processing in accordance with a print magnification, or is also able to be output in a state of being added to image data to be printed, to which the scaling processing in accordance with a print magnification has been given. First, when the scaling processing is also performed for the additional information to output, the main control portion 18 reads the additional information and an adding position thereof and provides to the image processing portion 16 before the scaling processing. Subsequently, the preview image generating portion 16a generates R'G'B' data of an image showing the additional information to synthesize with image data of an addition destination that is image data before the scaling processing at the above-described adding position. Then, the image enlarging processing/image reducing processing in accordance with a print magnification may be applied to the R'G'B' data to which the image of the additional information has been added.

When the scaling processing is not performed for the additional information, the main control portion 18 reads the additional information and an adding position thereof and provides to the image processing portion 16. Subsequently, the preview image generating portion 16a generates R'G'B' data of an image showing the additional information from the additional information to synthesize with R'G'B' data after the application of the image enlarging processing/image reducing processing in accordance with a print magnification at the above-described adding position, and performs processing for converting the number of pixels of the R'G'B' data after the addition into the number of pixels (display resolution) of the touch panel 32 and the image enlarging processing or image reducing processing based on a preview display magnification shown by the "display set value for a copy mode" stored in the control memory 19 at the same time.

Moreover, when the punching or the stapling is applied by the post processing apparatus, image data for post processing such as punch or staple may be output by synthesizing it and a preview image generated from image data to be printed (and data of the image showing the additional information) at a punching position or a stapling position. Alternatively, separately from a preview image generated from image data to be printed (and data of the image showing the additional information), image data for post processing such as punch or staple may be output to be aligned in adjacent thereto. In the latter case, since the synthesizing processing is not required, the processing time becomes shorter. Either method is capable of displaying a finish state of paper on which an image is to be formed in the preview display of image data.

As the output tone correction processing, output γ correction processing for displaying image data on the touch panel 32 is performed for the R'G'B' data of the preview image or the preview image and the R'G'B' data of the image for post processing. In the output tone correction processing, processing in accordance with an original type indicated by the original determination data may be performed, for example, including differentiating processing contents between a text area and other areas.

The two-color processing is executed only when a two-color mode for outputting image data in two colors of red and black, for example, is selected. As the two-color processing, processing of converting the RGB data after the application of the image quality adjustment processing into CMY data that represents specified two colors (red and black in this case) is performed. The generated CMYK data is converted into R'G'B' data based on display characteristics of the touch panel 32 at the subsequent color correction processing.

The R'G'B' data generated by the preview image generating portion 16a and processed in the output tone correction processing is provided to the touch panel 32. The panel control portion 11 performs control for the touch panel 32 to display an image corresponding to the R'G'B' data in a state of being incorporated in a display position shown by the "display set value for a copy mode" read from the control memory 19 of a GUI image and displays the GUI image on the touch panel 32. For example, when a setting for displaying an image showing additional information at a substantially intermediate position between an upper end and a lower end of a screen (GUI image at an incorporation destination) is included as the "display set value for a copy mode", the display position shown by the "display set value for a copy mode" indicates such a display position of a preview image that the image of the additional information is at the substantially intermediate position. A user confirms an image displayed for previewing that includes the image showing the additional information and determines whether to directly execute or stop printing or whether to delete the additional information or execute changing of the adding position (or changing of the additional information) and then, is able to perform an operation corresponding thereto.

Note that, an operation mode involving a printing operation also includes a mode in which image data received by facsimile communication or the like is printed and a mode in which image data stored in the image storage portion 15 through a network, a USB memory or the like without being read by the reading portion 13 is selected and printed, which may be treated as one kind of copy modes or may be treated as another operation mode to use a display set value in accordance with each operation mode. Among them, the preview display operation before printing of image data received by facsimile and stored in the image storage portion 15 will be described below.

Further, such a display set value in accordance with an operation mode (a set value affecting a display magnification and a display position, etc.), and a preview display using the same are main characteristic features of the present invention and will be described below collectively with other operation modes. When a user operation of changing a preview display magnification or a display position is performed for a GUI image in which a preview display is performed first, image enlarging processing, image reducing processing, or position changing processing may be performed based on the change to display again.

<Supplement for Original Reading, Preview Display and Printing>

Although description has been given for the preview display operation separately from the printing operation, the printing operation may be firstly performed such that the image data (CMYK data) after the application of the output tone correction processing is converted into the R'G'B' data based on display characteristics of the touch panel 32, is applied with conversion processing corresponding to the number of pixels (display resolution) of the touch panel 32 and scaling processing in the preview display, and is displayed on the touch panel 32 in a state of being incorporated in a display position shown by the "display set value for a copy mode" in a GUI image. Since the printing operation is completed to a certain extent and the printing operation after the preview display is able to be completed quickly, it is useful in a case where a setting is made such that a preview is previously displayed, for example, when the copy operation is performed.

In addition, an example in which the coded image data, the original classification data and the segmentation data are stored in the image storage portion 15 in association with one another has been taken as the original reading operation, and the printing operation and the preview display operation have been also described based on the example. As an alternative method thereof, coding may be performed only for the image data read by the reading portion 13, and the coded image data may be temporarily stored in the image storage portion 15. In this case, it may be configured such that the image processing portion 16 applies the original type determination processing and the segmentation processing to the image data that has been read from the image storage portion 15 and decoded by the coding/decoding portion 17 in the printing operation and the preview display operation. In addition, such an alternative method is also applicable in sending image data such as facsimile sending or internet FAX sending, which will be described below.

<Supplement for Filing Operation>

As described as the original reading operation, the filing operation is an operation of storing read image data (which is coded as the occasion demands) in the image storage portion 15 provided inside the digital multi-functional peripheral 1. In filing, it is also possible to store (file) image data to be stored after adding additional information thereto. Although the preview display operation for the image data to be filed in the image storage portion 15 is basically as described in the image data to be printed, a display set value for a filing mode is used as the display set value. A setting to display at a substantially intermediate position between an upper end and a lower end of a screen may be also performed in the display set value for a filing mode.

<Printing Operation for Image Data Received by Facsimile>

Next, description will be given for the printing operation for image data received by facsimile communication. When detecting a facsimile communication request by the modem 24, the main control portion 18 gives an instruction to the recording portion 12, the image storage portion 15, the image processing portion 16, the NCU 23, the modem 24, and the like to execute processing as will be described below.

First, the modem 24 and the NCU 23 sequentially receive image data (compressed image data) sent from a sending source according to the communication procedure and expand the received compressed image data, and execute rotating processing (processing of rotating a sending direction), resolution conversion processing, and the like as necessary to provide to the image processing portion 16 at the same time.

Since the image data received by facsimile communication is black-and-white binary data, particular processing is not performed for the image data (K data) to which processing such as expansion has been given in the image processing portion 16, and the image data is directly given to the recording portion 12. The recording portion 12 receives the image data and executes printing by an electrophotographic system, an inkjet system, or the like. It is also possible to perform printing for the image data received by facsimile communication after adding the above-described additional information thereto.

Description has been given for the facsimile reception of the monochromatic image, but when a color facsimile image (RGB data) is received, the image processing portion 16 may execute the image processing for facsimile reception described here for the RGB data.

<Preview Display Operation for Image Data Received by Facsimile>

The preview display operation for image data received by facsimile communication will be briefly described based on the printing operation for the same image data. The preview display operation is performed, for example, when a previous setting or a user operation to execute printing after confirming the received image data in advance is performed. In the preview display operation, when the additional information is added to the image data to which processing such as expansion has been given, the image processing portion 16 synthesizes the image data of the additional information, and then performs conversion processing in accordance with the number of pixels (display resolution) of the touch panel 32 and scaling processing in the preview display, and the image data after the application of the scaling processing is displayed on the touch panel 32 in a state of being incorporated in a GUI image at a display position shown by the "display set value for a copy mode". The preview display before executing printing for the image data received by facsimile may be treated as a copy mode. A user is able to confirm the image displayed for previewing and determine whether to execute or cancel printing to perform a printing or canceling operation.

<Facsimile Sending Operation>

Next, description will be given for a sending operation when image data of a read original is sent by facsimile. The facsimile image data is sent to destination (sending destination) information set by the user operation from the touch panel 32 or the key operation portion 31. The destination information (telephone number in this example) is stored in the control memory 19 and is read out as necessary. The destination information is generally stored as address book data so that information of each of a plurality of destinations is viewable and selectable, or is directly input before sending.

When the user operation to execute the facsimile sending is received by the operation panel 30, the main control portion 18 gives an instruction to the image storage portion 15, the image processing portion 16, the coding/decoding portion 17, the NCU 23, the modem 24, and the like to execute processing as will be described below. Note that, the main control portion 18 also gives an instruction to the reading portion 13 (original reading instruction), for example, when the operation to send the original by facsimile is performed. Note that, it is also possible for the main control portion 18 to select image data to be sent and start to send it by facsimile as it displays a preview of the image data stored in the image storage portion 15.

The coding/decoding portion 17 reads and decodes image data to be printed and original determination data and segmentation data corresponding thereto from the image storage portion 15 and gives the coded data to the image processing portion 16. The image processing portion 16 executes various image processing (hereinafter, referred to as image processing for facsimile sending) for the decoded image data (RGB image data). As will be schematically described below, examples of the image processing for facsimile sending include image quality adjustment processing, spatial filter processing, scaling processing, output tone correction processing, and halftone generation processing. The spatial filter processing and the halftone generation processing may be processing in accordance with various areas indicated by the segmentation data, while it is possible not to use the segmentation data. Further, in the original reading operation following the facsimile sending, the segmentation processing for the read image data and coding and storage of the segmentation data may not be executed.

As the image quality adjustment processing, the decoded image data is converted into K data using a matrix coefficient. In this case, a matrix coefficient in accordance with an original type indicated by the original determination data may be used. As the spatial filter processing, enhancement processing or smoothing processing is performed for the K data. As the scaling processing, image enlarging processing or image reducing processing in accordance with a sending resolution set by the operation panel 30 or a default-set sending resolution is performed for the K data after the application of the spatial filter processing. As the output tone correction processing, output γ correction processing for the purpose of outputting to a recording medium such as recording paper at a sending destination, for example, is performed to the K data after the application of the scaling processing. Actually, it is possible to perform output γ correction to a general device but not output γ correction that takes a device of the sending destination into consideration. As the halftone generation processing, binarization by error diffusion processing, for example, is performed for the K data after the application of the output tone correction processing. In the output tone correction processing and the halftone generation processing, processing in accordance with an original type indicated by the original determination data may be performed.

Description has been given for the facsimile sending of the monochromatic image, but when a color image is sent by facsimile, the image processing portion 16 may perform processing of converting the decoded image data into L*a*b* data for color transmission using a matrix coefficient as the image quality adjustment processing in the above-described image processing for facsimile sending so that the subsequent processing is performed for the L*a*b* data.

The rotating processing is applied to the image data after the application of the halftone generation processing as the occasion demands and the image data after the application of the halftone generation processing is compressed and coded by the coding/decoding portion 17 in a compression format at the facsimile sending, and then temporarily saved in the image storage portion 15. The modem 24 performs sending procedure to a sending destination set through the NCU 23, and at the time when communication with the sending destination is established (at the time ready for sending), the coded K data which is temporarily saved is read out and sequentially sent to the sending destination through the public line network after the application of necessary processing such as changing of the compression format.

In addition, the digital multi-functional peripheral 1 is also capable of sending image data to be sent with additional information added thereto. When sending image data to the outside like in this example, it is also possible to add sending source information (transmission source information) in addition to a stamp, date (date and time), and a page number as the additional information. In this case, the sending source information that is added in sending image data may include any one or more pieces of information of a name of a sender, information of a telephone number of a sending source, and information of an electronic mail address of a sending source. Moreover, information of a sending destination (information of a destination) and the like may be added as the additional information in sending image data.

In the case of the facsimile sending with additional information added, synthesizing processing may be performed as follows. The main control portion 18 reads additional information and information showing an adding position, the main control portion 18 or the image processing portion 16 converts the information into image data, and the image processing portion 16 synthesizes the converted image data (image data of additional information) and image data of an addition destination that is image data after the application of the scaling processing at the above-described adding position. In the digital multi-functional peripheral 1, the position at which the image data of the additional information is added is possibly set by a user from the operation panel 30 as the user performs the preview display as will be described below. The synthesized image data is sent to the sending destination after the above-described output tone correction processing, rotating processing, and compression processing, etc., are applied to it.

<Preview Display Operation for Image Data to be Sent by Facsimile>

The digital multi-functional peripheral 1 is configured so as to be possible to display image data to be sent by facsimile sending or the like for previewing. The preview display operation is performed, for example, when the previous setting or the user operation to execute sending after the confirmation of the image data before sending in advance is performed. Description will be given for the preview display operation for the image data to be sent by facsimile based on the facsimile sending operation for the same image data. In the preview display operation, the main control portion 18 also gives an instruction to the panel control portion 11.

In the preview display operation, it is good that the image processing portion 16 performs the same processing as that in the facsimile sending up to the image quality adjustment processing and the spatial filter processing (and the scaling processing), and the preview image generation processing is executed by the preview image generating portion 16a and the output γ correction processing for displaying the image data is performed as the output tone correction processing. As the preview image generation processing, the preview image generating portion 16a generates the data of the preview image by performing conversion processing in accordance with the number of pixels (display resolution) of the touch panel 32 and scaling processing in accordance with a reducing/enlarging ratio in the preview display shown by a "display set value for a data send mode" for image data after the application of the image enlarging processing/image reducing processing in accordance with a sending resolution. Note that, in the preview display operation, the spatial filter processing may not be executed and the halftone generation processing is not executed. Here, the data send mode is a mode for sending image data to the outside (external device), including a facsimile send mode, an internet FAX send mode, and a file transfer mode, and is also referred to as an image send mode.

R'G'B' data generated by the preview image generating portion 16a and dealt with by means of the output tone correction processing is given to the touch panel 32. The panel control portion 11 performs control for the touch panel 32 to display an image corresponding to the R'G'B' data in a state of being incorporated in a GUI image and displays the GUI image on the touch panel 32. The incorporating position is defined as a display position shown by the "display set value for a data send mode" read from the control memory 19 in the GUI image.

Description will be given for a preview image that is sent with additional information added thereto. The additional information is output by being added to image data after the application of the scaling processing in accordance with a sending resolution. More specifically, the main control portion 18 reads the additional information and an adding position thereof and gives the information and the position to the image processing portion 16. Subsequently, the preview image generating portion 16a generates R'G'B' data of an image showing the additional information from the additional information and synthesizes it and R'G'B' data after the application of the image enlarging processing/image reducing processing in accordance with a sending resolution at the above-described adding position. Then, processing for converting the number of pixels of the R'G'B' data after the addition into the number of pixels (display resolution) of the touch panel 32 is performed and the image enlarging processing or image reducing processing is performed based on a preview display magnification shown by the "display set value for a data send mode" stored in the control memory 19 at the same time.

The image data combined with the image of the additional information in this manner, after the application of the above-described output tone correction processing (output γ correction processing for displaying image data) in the preview display, is displayed on the touch panel 32 in a state of being incorporated in a display position shown by the "display set value for a data send mode" in a GUI image by the panel control portion 11. A user is able to confirm an image displayed for previewing that includes the image of the additional information and determine whether to directly execute or stop facsimile sending or whether to delete the additional information or execute changing of the adding position (or changing of the additional information) to perform an operation corresponding thereto.

<Sending Operation for Image Data via Internet>

Next, description will be given for a sending operation when image data of a read original is sent by an electronic mail or internet FAX via the internet. Such image data to be sent via the internet is also sent to sending destination information (electronic mail address in this example) set by the user operation from the touch panel 32 or the key operation portion 31 and stored in the control memory 19.

When the user operation concerning the sending via the internet is received by the operation panel 30, the main control portion 18 gives an instruction to the format converting portion 14, the image storage portion 15, the image processing portion 16, the coding/decoding portion 17, the LAN control portion 21, and the like to execute sending processing via the internet as will be described below. Note that, the main control portion 18 also gives an instruction to the reading portion 13 (original reading instruction), for example, when an operation to send an original via the internet is performed.

The coding/decoding portion 17 reads and decodes image data to be printed and original determination data and segmentation data corresponding thereto from the image storage portion 15, and gives the decoded data to the image processing portion 16. The image processing portion 16 executes various image processing (hereinafter, referred to as image processing for internet sending) to the decoded image data (RGB image data). Examples of the image processing for internet sending include the image quality adjustment processing, the spatial filter processing, the scaling processing, the output tone correction processing, and the halftone generation processing, which have been described in the image processing for facsimile sending.

Moreover, the image processing in the case of color image sending is also the same as the image processing for facsimile sending, and in the image processing for internet sending, the image processing portion 16 may perform processing of converting the decoded image data into L*a*b* data for color transmission using a matrix coefficient as the image quality adjustment processing so that the subsequent processing is performed for the L*a*b* data.

The coding/decoding portion 17 codes (compresses) the image data after the application of the image processing for internet sending to obtain compressed files. The compression is performed in the unit of a single page of the original. Subsequently, the format converting portion 14 converts the compressed files into a single file and the file is attached to a multipart mail according to MIME (Multipurpose Internet Mail Extension), for example. By the processing so far, the read image data is converted into a format of an electronic mail. The electronic mail is sent to a sending destination via the internet using a mail transfer protocol such as an SMTP (Simple Mail Transfer Protocol) through a LAN interface by the LAN control portion 21.

In the case of the internet facsimile sending, the coding/decoding portion 17 may perform the compression in a compression format only for facsimile such as MH, for example, and the format converting portion 14 may convert the obtained compressed files in the unit of a page, for example, into a single TIFF file. In the case of sending just by attaching to the electronic mail as an attached file (in the case of sending by so-called scan to e-mail), the coding/decoding portion 17 may perform the compression in a compression format such as JPEG, for example, and the format converting portion 14 may convert the obtained compressed files in the unit of a page into a single PDF file, for example.

In addition, even when image data to be sent is image data sent via the internet, the digital multi-functional peripheral 1 is capable of sending the image data with additional information added thereto in the same manner as the case of the facsimile sending image data. As the additional information adding processing, the synthesizing processing described in the facsimile sending may be executed, and the image data is subjected to the output tone correction processing, the compression processing, the format conversion processing, and the like described above and thereafter sent to an address of a sending destination as an electronic mail.

<Preview Display Operation for Image Data to be Sent via Internet>

As mentioned in the description for the preview display in the facsimile sending, the digital multi-functional peripheral 1 of the present invention is capable of being configured so that a preview of image data to be sent via the internet is also able to be displayed on the touch panel 32.

In the preview display operation, similarly in the description for the preview display in the facsimile sending, the image processing portion 16 performs the same processing as in the image processing for internet sending up to the image quality adjustment processing and the spatial filter processing (and the scaling processing), and the preview image generation processing is executed by the preview image generating portion 16a, and the output γ correction processing for displaying the image data is performed as the output tone correction processing. R'G'B' data generated by the preview image generating portion 16a and dealt with by means of the output tone correction processing is given to the touch panel 32 and is displayed on the touch panel 32 in a state of being incorporated in a display position shown by the "display set value for a data send mode" in a GUI image by the panel control portion 11. The description for the preview display in the facsimile sending may be also applied to the preview display with an image showing additional information added.

<Description for Preview Display Before Outputting (Sending, Printing, or Filing) Image Data According to the Present Invention>

The digital multi-functional peripheral 1 according to the present invention is an apparatus capable of operating in a plurality of operation modes by switching an operation mode between the plurality of operation modes. The operation mode here indicates an operation mode that shows operational contents executable by the digital multi-functional peripheral 1, and examples thereof include a copy mode, an image send mode (data send mode), and a document filing mode as described above. Note that, the operation mode is a mode mainly decided in accordance with an output form, but may be treated as a mode decided in accordance with an input form or may be treated as a mode decided in accordance with both an input form and an output form.

In addition, as described for the control memory 19, the digital multi-functional peripheral 1 according to the present invention is provided with a set value storage portion that stores a display set value when a preview image is displayed at first on the image display portion. The display set value is a set value when a preview display of image data to be output is performed at first (an initial value of a display setting, that is, a default setting of a display) and is able to be differentiated (varied) in accordance with an operation mode as described above.

The image data to be output may be image data input from any of a scanner apparatus illustrated as the reading portion 13, an attachable/detachable storage apparatus illustrated as the USB memory connected to the USB I/F 25, and a communication line illustrated as the LAN or the line. The image data to be output may also be image data read from a storage apparatus illustrated as the image storage portion 15 provided in the digital multi-functional peripheral 1.

As described for the preview display operation before printing in copying, filing, and sending data by facsimile or the like, the digital multi-functional peripheral 1 according to the present invention has the preview image generating portion 16a that reads image data to be output from the image storage portion 15 and generates a preview image thereof. The preview image generated first to be displayed first is an enlarged/reduced image based on a display magnification shown by a display set value of an operation mode, preferably is a reduced image. The first preview image generated by the preview image generating portion 16a is sent to the touch panel 32 by the control from the main control portion 18, controlled to be displayed in a state of being incorporated in a display position shown by an operation mode in a GUI image by the panel control portion 11, and displayed on the touch panel 32. In this manner, the touch panel 32 is an example of an image display portion that displays a preview of the image data to be output.

As described above, the digital multi-functional peripheral 1 is also capable of outputting image data to be output with additional information added thereto, and the panel control portion 11 performs control to display an image of the additional information on the touch panel 32 based on the control from the main control portion 18. Thus, the preview image generating portion 16a generates such an image of the additional information, and synthesizes the generated image and the preview image generated from the image data to be output to generate a preview image with the additional information. Note that, although description has been given assuming that an image showing additional information itself is synthesized at an adding position to be displayed in the preview display, it may be configured such that an existence image showing that additional information is existent is displayed instead of the additional information.

The panel control portion 11 performs control for the touch panel 32 to display the generated preview image in a state of being incorporated in a GUI image and displays the GUI image on the touch panel 32. The incorporating position is defined as a display position shown by "a display set value for an operation mode" read from the control memory 19 in the GUI image. In this manner, each of the preview image generating portion 16a and the panel control portion 11 is one example of a display control portion that performs control to display the additional information in the preview display for the image display portion.

According to the above-described configuration, it is possible in the present invention to differentiate a display form of image data that is first displayed for previewing in accordance with an operation mode, and therefore, by setting an image considered as important by the user to a display set value as a standard value, it is possible to reduce operational burdens such as enlarging, reducing, and shifting by the user in the preview confirmation to reduce erroneous processing of image data. That is, the present invention is capable of, in performing a first preview display of image data to be output, confirming a confirmation point in accordance with an operation mode immediately without performing a user operation of such as enlarging, reducing, and shifting.

<Specific Example of Preview Display>

Referring to FIGS. 4 to 11, description will hereinafter be given for an exemplary display of a preview image of image data to be output for each operation mode and for the flow of a preview display thereof, with specific examples thereof.

Figure 4:
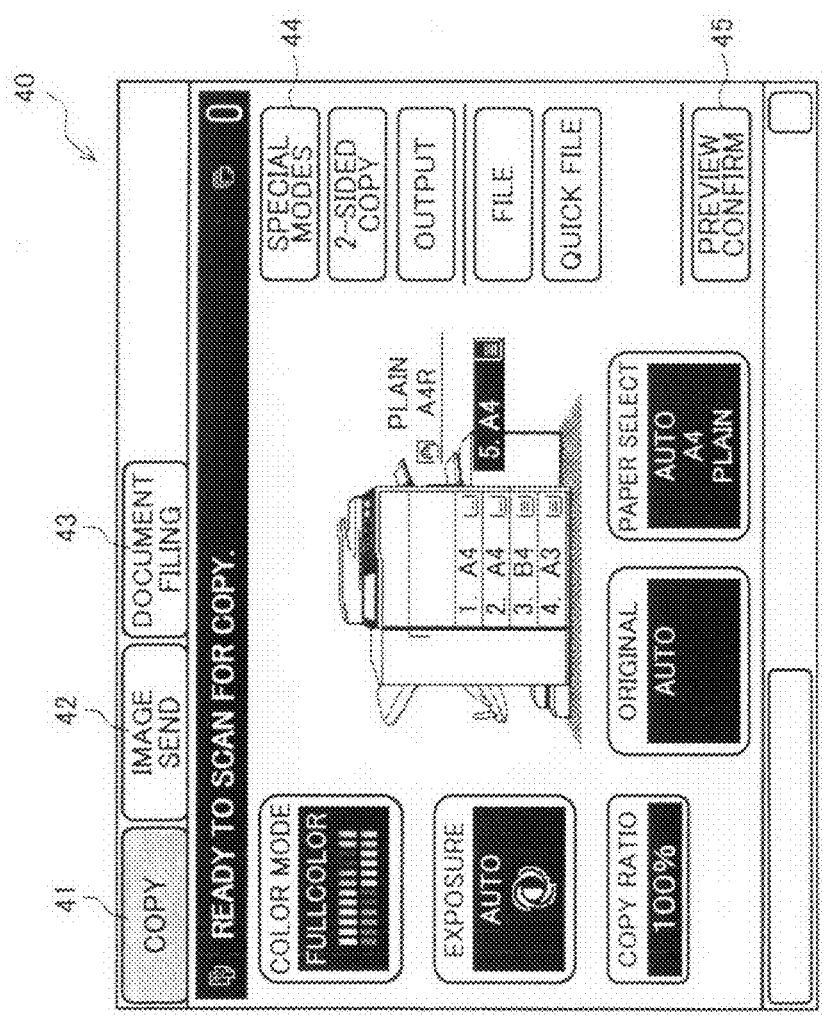
FIG. 4 is a diagram for showing an example of a standard screen of the digital multi-functional peripheral explained in FIGS. 2 and 3.

FIG. 4 is a diagram for showing an example of a standard screen of the digital multi-functional peripheral explained in FIGS. 2 and 3. FIG. 4 shows an example of a GUI image (referred to as a GUI image 40) displayed on the touch panel 32 in the digital multi-functional peripheral 1 as the standard screen. The GUI image 40 of the standard screen is displayed on the touch panel 32 when a power source of the digital multi-functional peripheral 1 is turned on or reset. In the GUI image 40, a copy mode selection key 41, an image send mode selection key 42, and a document filing mode selection key 43 are displayed to select an operation mode of the digital multi-functional peripheral 1, and the GUI image 40 shows a state where the copy mode is selected.

In the copy mode, various condition settings are possible to perform a copy. For example, a 2-sided copy key for performing a setting of 1-sided/2-sided copy, an output key for performing a setting of post processing such as punch or staple, a special modes key 44 for performing other detailed settings in copying, a preview confirm key 45 for confirming a finish state of an image read by a scanner, an image input from an external device, or an image stored in a storage apparatus such as HDD, and the like are provided. Setting items of the stapling include a setting of an ejection direction of recording paper, a setting of a binding position of the staple, and the like. In addition, setting items of the post processing include a setting of sorting processing, an offset setting for deciding a width to be shifted in sorting sheets to be output in an overlaid manner, a setting of booklet binding, a setting of paper folding, and the like.

The user is also able to display a preview of image data by operating the preview confirm key 45 using the touch panel 32. Note that, the key 42 or the key 43 is selected to shift to a data send mode (image send mode) or a filing mode (document filing mode), where a GUI image for setting in each operation mode is displayed so that various settings in accordance with each operation mode are able to be performed. Also in the GUI image of each operation mode, the preview confirm key is displayed so as to be selectable or the key for shifting to a GUI image of a lower layer in which the preview confirm key is displayed so as to be selectable is displayed so as to be selectable.

Figure 5:
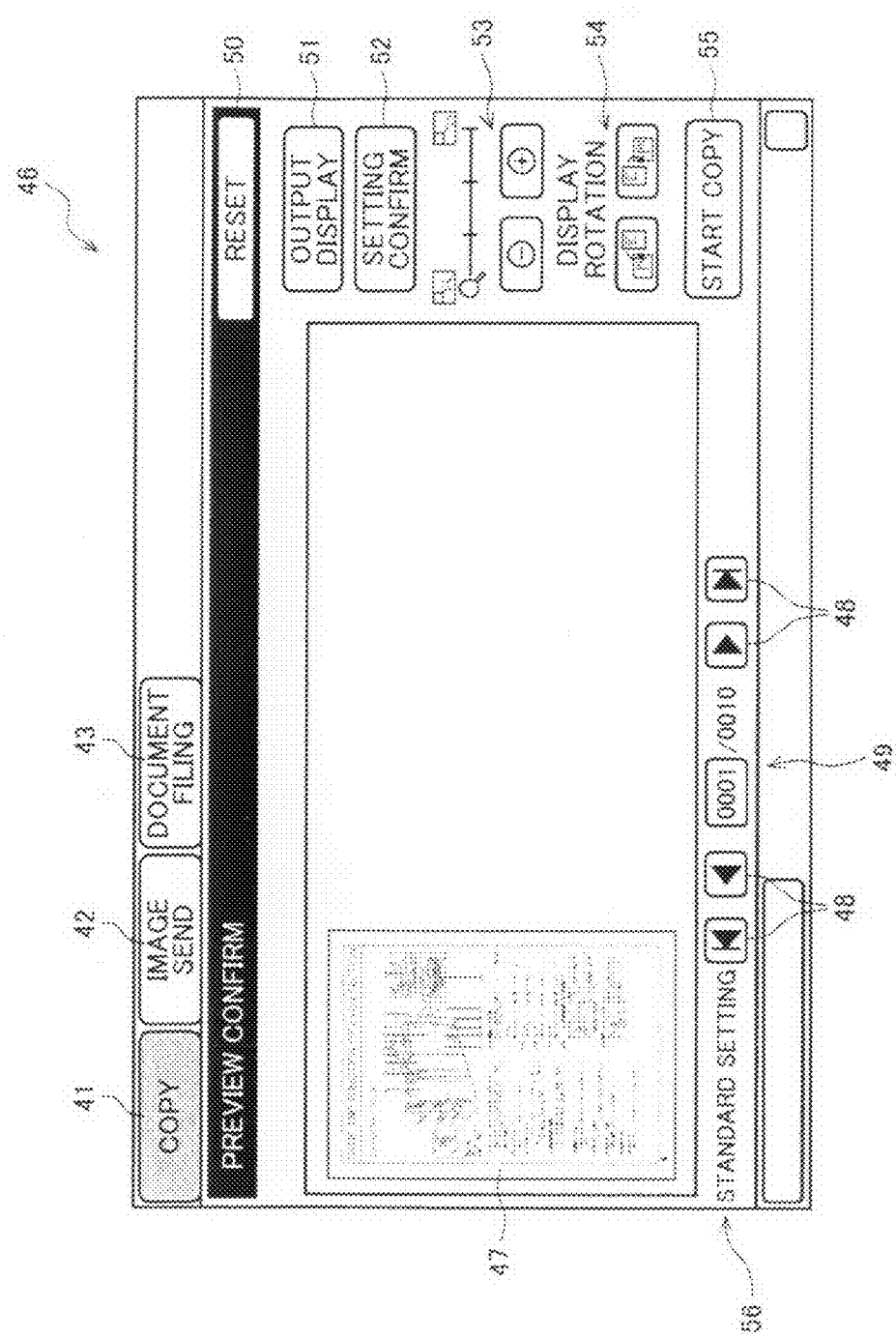
FIG. 5 is a diagram for showing an example of a preview display screen in a copy mode in the digital multi-functional peripheral explained in FIGS. 2 and 3.
Figure 6:
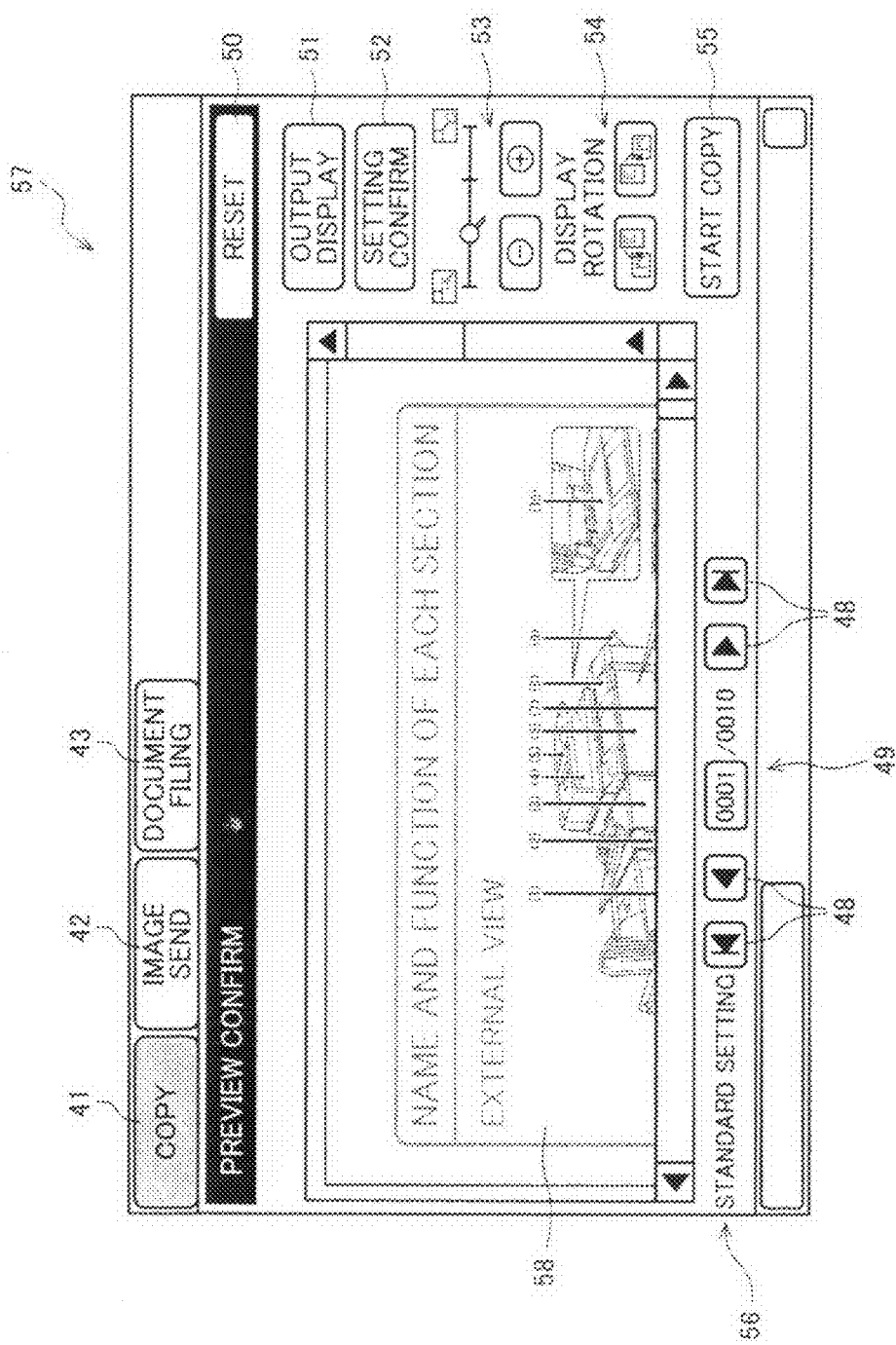
FIG. 6 is a diagram for showing another example of a preview display screen in a copy mode in the digital multi-functional peripheral explained in FIGS. 2 and 3.

FIGS. 5 and 6 are diagrams for showing an example of a preview display screen in a copy mode in the digital multi-functional peripheral explained in FIGS. 2 and 3. FIG. 5 shows an example of a GUI image that includes a preview image of certain image data to be printed, that is displayed first in a copy mode, and FIG. 6 shows an example of a GUI image when a preview image is displayed in enlargement in the GUI image of FIG. 5.

A GUI image 46 shown in FIG. 5 is displayed when the preview confirm key 45 of the GUI image 40 of FIG. 4 is selected (without shifting to another screen). The GUI image 46 is an image in which a preview image 47 generated from image data to be printed by the preview image generating portion 16a based on a display set value in a copy mode that is stored in the control memory 19 is displayed in a state of being incorporated in a GUI image based on the display set value. In the GUI image 46, an image 56 showing that a display with a "standard setting" is performed is displayed.

Brief description will be given for a display set value again. As described above, there is a case where a confirmation point is different depending on an operation mode such as a copy mode, a data send mode, or a filing mode, even when a preview display of an image is performed. Accordingly, a display set value is set for each operation mode as illustrated in a copy mode in order to allow the user to visually identify the point accurately by the first preview display.

In addition, the preview image 47 shows reduced image data for each page. Thus, information 49 showing a current page and a page switch key 48 are displayed at the same time on the GUI image 46 to change a page of image data displayed for previewing. The shift key 48 includes a top page shift key for displaying a first page, a previous page shift key for displaying a page before a current page, a next page shift key for displaying a page next to a current page, and a last page shift key for displaying the last page. The preview image 47 is displayed for each page in this manner and the user is able to display the preview image of an arbitrary page by operating the page switch key 48 appropriately.

When a first preview display based on a display set value of the present invention is performed in this manner, at least a preview image displayed first is preferably an image in which image data to be output is sequentially displayed in the unit of a page to be output. This is because a point to be confirmed by the user is often collected in a page (a page corresponding to a piece of sheet in the case of printing) in any operation mode.

In the GUI image 46, a setting confirm key 52, an enlarging/reducing key 53, a display rotation key 54, and the like are further displayed so as to be selectable, and by operating these keys appropriately, the user is able to confirm a setting of the preview image 47 or to confirm by enlarging/reducing or rotating the preview image 47.

For example, when the preview image is enlarged, an enlarged preview image 58 as shown in a GUI image 57 of FIG. 6 is displayed and a scroll bar is displayed at the same time so that the entirety is able to be confirmed. While an image 56 showing a display with a "standard setting" is performed is not displayed when shifting from FIG. 5 to FIG. 6, the image 56 is displayed when the GUI image 57 of FIG. 6 is displayed as a first preview display based on a display set value.

Moreover, in the GUI image 46, an output display key 51 for displaying a finish state is also displayed so as to be selectable and a reset key 50 is displayed so as to be selectable. When a necessity of resetting print conditions after confirming the preview image 47 arises, the user is able to display a GUI image for resetting the print conditions by operating the reset key 50. Then, it is possible to reset the print conditions using the resetting screen to display the preview image 47 based on the reset print conditions. In addition, a copy start key 55 is displayed on the GUI image 46 so as to be selectable, and when the user operates the copy start key 55, processing for performing image formation (printing) of the image data displayed for previewing is started. Note that, in facsimile reception, the preview image 47 in the GUI image 46 may be also displayed in the same manner.

While the preview image 47 of FIG. 5 shows the entire image data, it is highly required in the case of a copy mode to confirm an arrangement form of the entire image in which a printing mode such as 2-sided/1-sided, a margin setting, and a finish state such as punch or staple are displayed. A preview display in a copy mode to respond to such a requirement will be described with reference to FIGS. 7 and 8.

Figure 7:
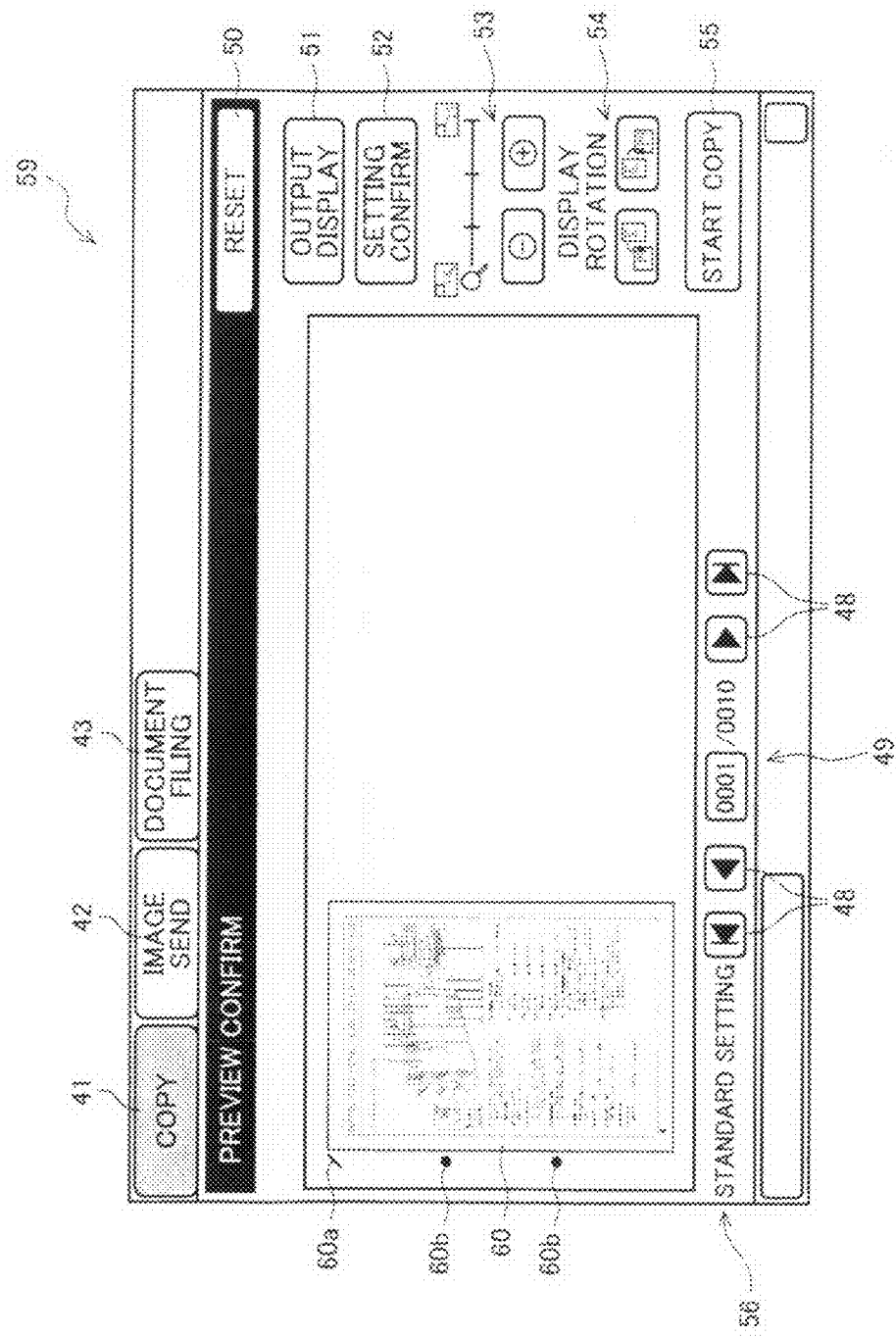
FIG. 7 is a diagram for showing another example of a preview display screen in a copy mode in the digital multi-functional peripheral explained in FIGS. 2 and 3.

FIG. 7 is a diagram for showing another example of a preview display screen in a copy mode in the digital multi-functional peripheral explained in FIGS. 2 and 3 and is a diagram for showing an example of a GUI image that includes a preview image of certain image data to be printed, that is displayed at first in a copy mode.

In a GUI image 59 shown in FIG. 7, a reduced image allowing discrimination of the finish state of the entire image is displayed as a preview image 60. In the preview image 60, a stapled image 60a and a punched image 60b are displayed near the processing position thereof as the finish state. In the GUI image 59, the image 56 showing a display with a "standard setting" is performed is displayed. Note that, the GUI image of FIG. 7 is also displayed when the output display key 51 is selected in the GUI image 46 of FIG. 5 or the GUI image 57 of FIG. 6, where the image 56 is not displayed.

In this manner, a display set value for a copy mode preferably includes a setting by which a display size of a preview image is such a size that the entire page is viewable. Moreover, the display set value for a copy mode preferably includes a setting by which a first preview image is displayed including a finish state in outputting. That is, in a copy mode, the finish state in outputting is preferably displayed together with the preview image or displayed in a state of being combined with the preview image. Since the finish state to be confirmed includes the stapling, the punching, the combination (N in 1), and the booklet stapling, and the finish state displayed in a copy mode is preferably a state as a result of applying any one of or a plurality of the processing.

Figure 8:
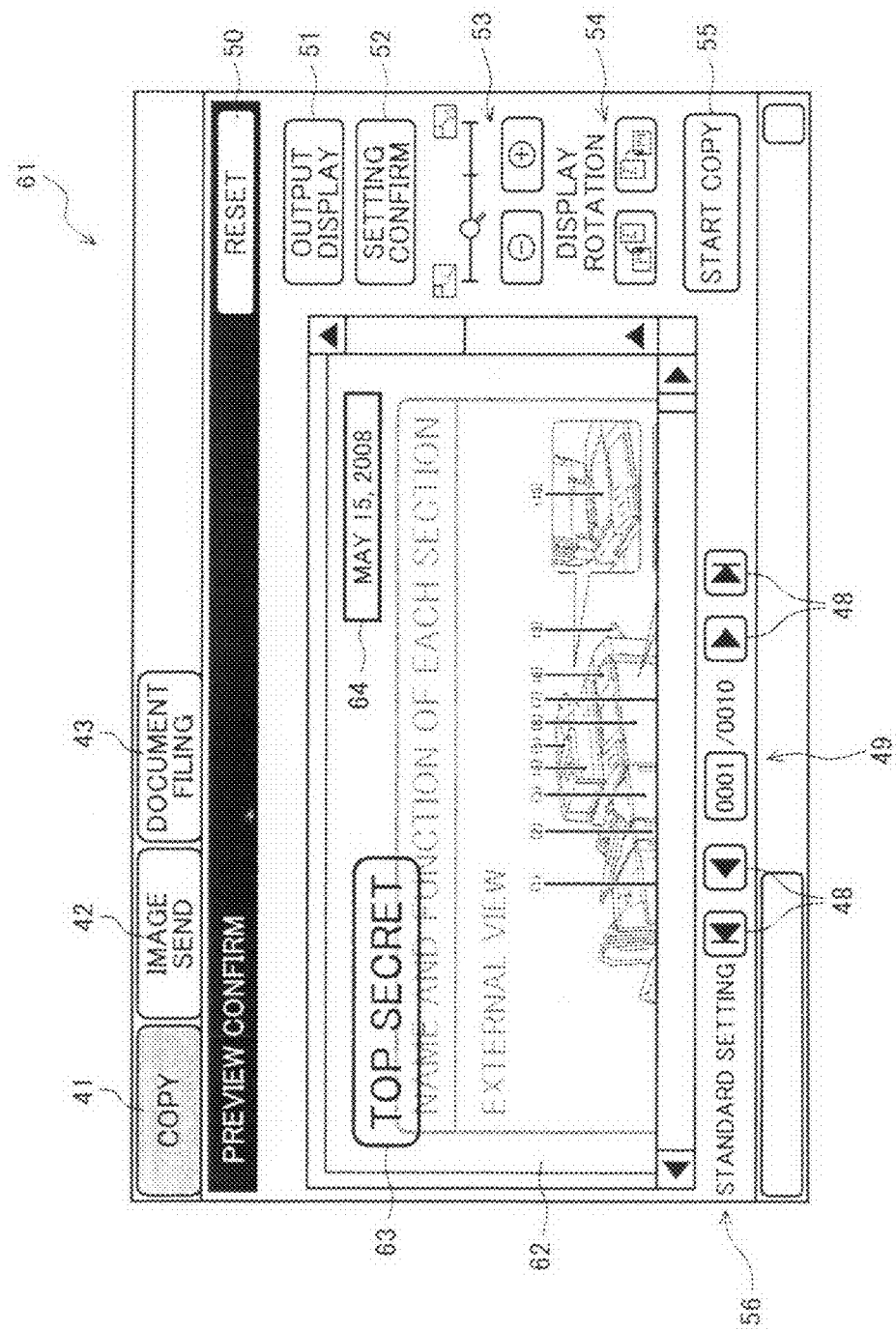
FIG. 8 is a diagram for showing another example of a preview display screen in a copy mode in the digital multi-functional peripheral explained in FIGS. 2 and 3.

Further, the finish state to be confirmed also includes the addition state of additional information such as a fixed stamp, date (or date and time), and a page number, which will be described with reference to FIG. 8. FIG. 8 is a diagram for showing another example of a preview display screen in a copy mode in the digital multi-functional peripheral explained in FIGS. 2 and 3, and is a diagram for showing another example of a GUI image that includes a preview image of certain image data to be printed, that is displayed first in a copy mode.

In a GUI image 61 shown in FIG. 8, a reduced image allowing discrimination of the finish state of the entire image is displayed as a preview image 62. In the preview image 62, a top secret stamp image 63 and a time stamp image 64 are displayed in a state of being possible to be confirmed at an adding position in an upper part of the image as the finish state. The image 56 showing a display with a "standard setting" is performed is also displayed in the GUI image 61.

The image 63 and the image 64 are displayed at a substantially intermediate position between upper and lower ends of the screen. In this manner, a display set value for a copy mode preferably includes a setting by which additional information to be added to image data in printing is displayed at a substantially intermediate position between an upper end and a lower end of the screen of the touch panel 32. This setting affects a preview display magnification and also affects a scroll position (that is, an incorporation range in a GUI image). Actually, the preview image 62 is more enlarged than the preview image 60 of FIG. 7 to display an image of the additional information at such a position. The preview display at such a position enables confirmation of the additional information which is an important confirmation point at a glance without a search.

Note that, the position of the additional information as shown in FIG. 8 is generally the same as in the printed state when printing is actually executed, but may be different in the case of saddle stitch printing or the like. For example, when an image of additional information corresponding to date and time, a fixed stamp, a page number, and arbitrary text is displayed in the preview image 62, the additional information is printed in a state of being added on a position as it is in a print page which is on the left side of spread pages, while only additional information of date and time may be added on the same position in a print page which is on the right side and other additional information may be printed in a state of being added on symmetry positions to a boundary line between the left side and the right side. Of course, even in the case of saddle stitch printing, additional information may be added on a position as it is in both a print page on the left side of spread pages and a print page on the right side thereof.

Further, in FIG. 8, the finish state by post processing such as punch or staple is not displayed, but when both adding processing of additional information and post processing are applied, the state of the post processing may be displayed together with the addition state of the additional information. The GUI image 61 of FIG. 8 is also displayed when the output display key 51 is selected in the GUI image 46 of FIG. 5 or the GUI image 57 of FIG. 6, where the image 56 is not displayed.

Although description has been given for a copy mode, confirmation of the entire image of data is also desired in a filing mode in which image data is stored similarly to the copy mode. Accordingly, a preview display is preferably performed in a state where additional information is added like in the preview image 62 of FIG. 8 similarly in the filing mode. Moreover, a display set value for a filing mode preferably includes a setting by which additional information to be added to image data in storing is displayed at a substantially intermediate position between upper and lower ends of the screen of the touch panel 32, similarly to that of the copy mode. Note that, since post processing such as punch or staple is not performed in the filing mode, an image related to the post processing like in FIG. 7 is not displayed. Although preferable examples have been given with reference to FIGS. 7 and 8, a display set value in the copy mode or the filing mode may be set so as to perform the display like in the preview image 47 of the GUI image 46 of FIG. 5 or the preview image 58 of the GUI image 57 of FIG. 6 as described above.

When data is sent by facsimile or an electronic mail in a data send mode, it is highly required to confirm details of header added to a sending original before sending. A preview display in a data send mode in order to respond to such a requirement will be described with reference to FIG. 9.

Figure 9:
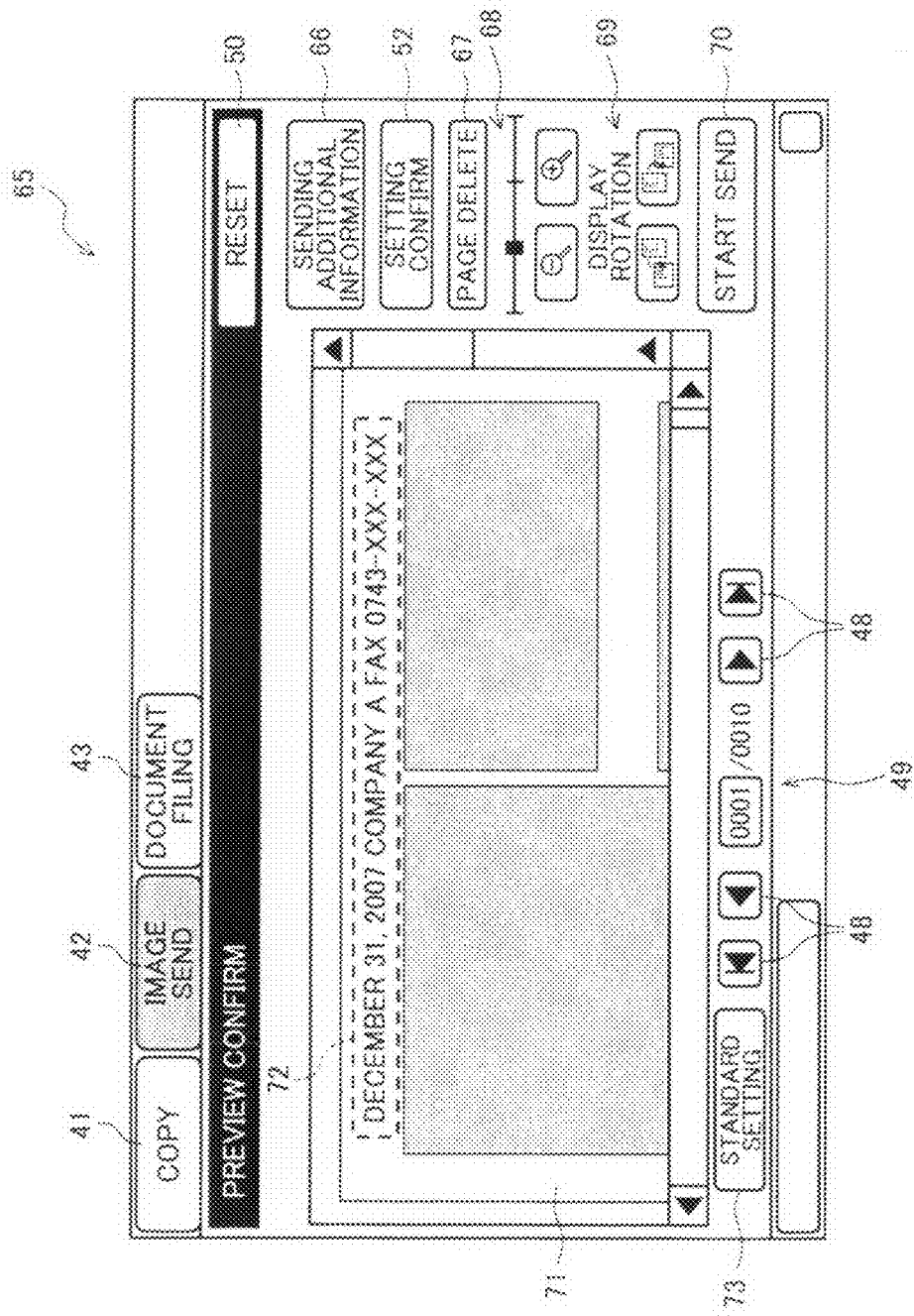
FIG. 9 is a diagram for showing an example of a preview display screen in a data send mode in the digital multi-functional peripheral explained in FIGS. 2 and 3.

FIG. 9 is a diagram for showing an example of a preview display screen in a data send mode in the digital multi-functional peripheral explained in FIGS. 2 and 3, and is a diagram for showing an example of a GUI image that includes a preview image of certain image data to be sent by facsimile, that is displayed first in a data send mode.

In a GUI image 65 shown in FIG. 9, a reset key 50, a setting confirm key 52, a sending additional information key 66 for displaying information to be added to header in sending, a page delete key 67 for deleting (removing from a sending target) a displayed page of a preview image, an enlarging/reducing key 68 same as the enlarging/reducing key 53, a rotation key 69 same as the display rotation key 54, a send start key 70 for executing a start of sending, and the like are displayed so as to be selectable. In the GUI image 65, a scroll bar, information 49 showing a current page, the page switch key 48, and the like are also displayed so as to be selectable.

In the GUI image 65, a preview image 71 is displayed and an uppermost part (uppermost position) thereof is displayed at the same time so as to provide a state where an image 72 of header information in sending an image (sending source information in this case) is able to be confirmed. Note that, by selecting the sending additional information key 66 in a state where the header image (sending source information) 72 is not displayed, the header image 72 is able to be displayed. In this manner, a display set value for a data send mode preferably includes a setting by which header information to be added to image data sent to the outside is displayed in a viewable size. This makes it possible to confirm an image of a sending source or the like immediately. Moreover, a display set value for a data send mode may include a setting by which a covering letter to be attached is displayed in sending to the outside. This makes it possible to confirm an image of the covering letter including a sending source, a destination and the like immediately.

Moreover, in the GUI image 65 of FIG. 9, a standard setting key 73 is displayed in the lower left of the screen so as to be selectable when a preview image is displayed. By selecting the standard setting key 73 after performing a display setting desired by the user, including enlargement, a setting of a display position, and an output display, it is possible to rewrite a display set value for a current operation mode. Such rewriting is applicable not only to a data send mode, but a standard screen in a preview is also able to be set for each operation mode in other operation modes. For example, in the GUI images 46, 57, 59, and 61 of FIGS. 5 to 8, the similar standard setting is possible by displaying the standard setting key so as to be selectable instead of the image 56 showing that a display with a "standard setting" is performed.

In this manner, the digital multi-functional peripheral 1 is preferably provided with a set value changing portion for changing a display set value in accordance with an operation mode by a user operation. This makes it possible to perform a preview display with a display set value which is different for each device and to perform a preview display in accordance with the usage environment.

Such a change is preferably allowed for each user. Thus, the digital multi-functional peripheral 1 may be provided with a user authenticating portion for authenticating a user. As the user authenticating portion, for example, authentication by a numeric keypad of an operation panel (not shown) or an IC card is employable. The authentication in this case may be simple authentication simply using only an ID or the like. The set value storage portion may be provided so as to be capable of storing a display set value in accordance with an operation mode for each user authenticated by the user authenticating portion, and the set value changing portion may be provided so as to be capable of changing a display set value in accordance with an operation mode for each user authenticated by the user authenticating portion. Such a configuration makes it possible to variably set a standard setting screen in a preview display in each operation mode for each user when the user authentication is performed. Since there is a case where confirmation points are different among users, such as desiring confirmation of a printing position of a stamp, depending on a user even in the case of users who use the same digital multi-functional peripheral 1, such a change of a display set value for each user is useful.

Figure 10:
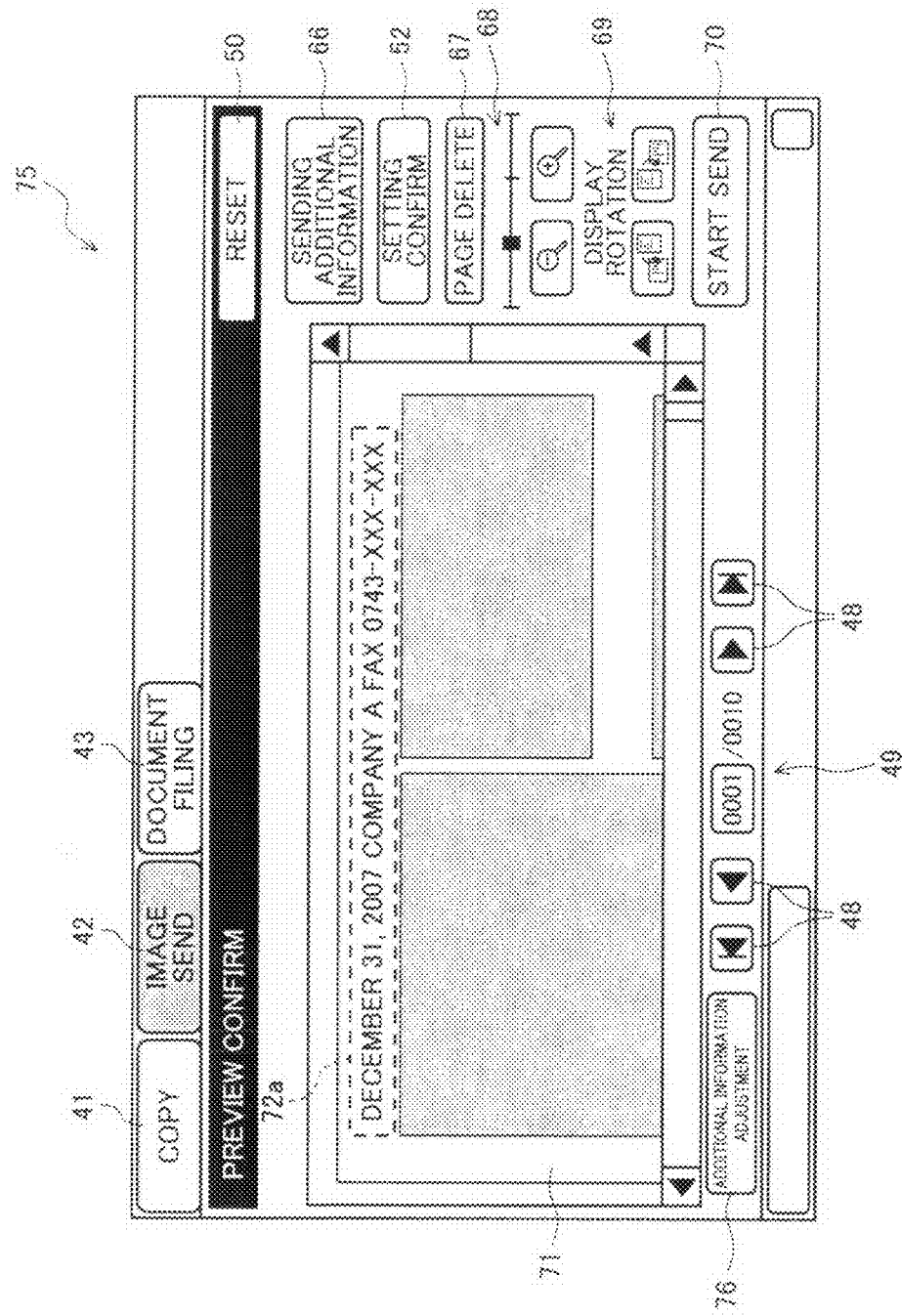
FIG. 10 is a diagram for showing another example of a preview display screen in a data send mode in the digital multi-functional peripheral explained in FIGS. 2 and 3.

FIG. 10 is a diagram for showing another example of a preview display screen in a data send mode in the digital multi-functional peripheral explained in FIGS. 2 and 3, and is a diagram for showing another example of a GUI image that includes a preview image displayed at first in a data send mode.

In a GUI image 75 shown in FIG. 10, an additional information adjustment key 76 is displayed instead of the standard setting key 73 in the GUI image 65 of FIG. 9. By selecting the additional information adjustment key 76, it is possible to adjust an adding position of additional information. For example, when a pop-up image for adjustment is displayed, adjustment by the user is made possible. A header image 72a combined with a preview image 71 of FIG. 10 shows a state after shifting to the left compared to the header image 72 of FIG. 9. An image showing that a preview display is currently performed with a standard setting (image 56 of FIG. 5), which is not shown, is displayed simultaneously with the additional information adjustment key 76 in the first preview display, and the display may be changed to the standard setting key 73 of FIG. 9 during adjustment.

Description has been given for the initial preview display for each operation mode with specific examples. In addition, a display set value preferably includes a setting by which a display magnification of a preview image of image data to be output is differentiated in accordance with an operation mode. This makes it possible to change a display magnification of a preview image that is displayed at first in accordance with an operation mode.

Figure 11:
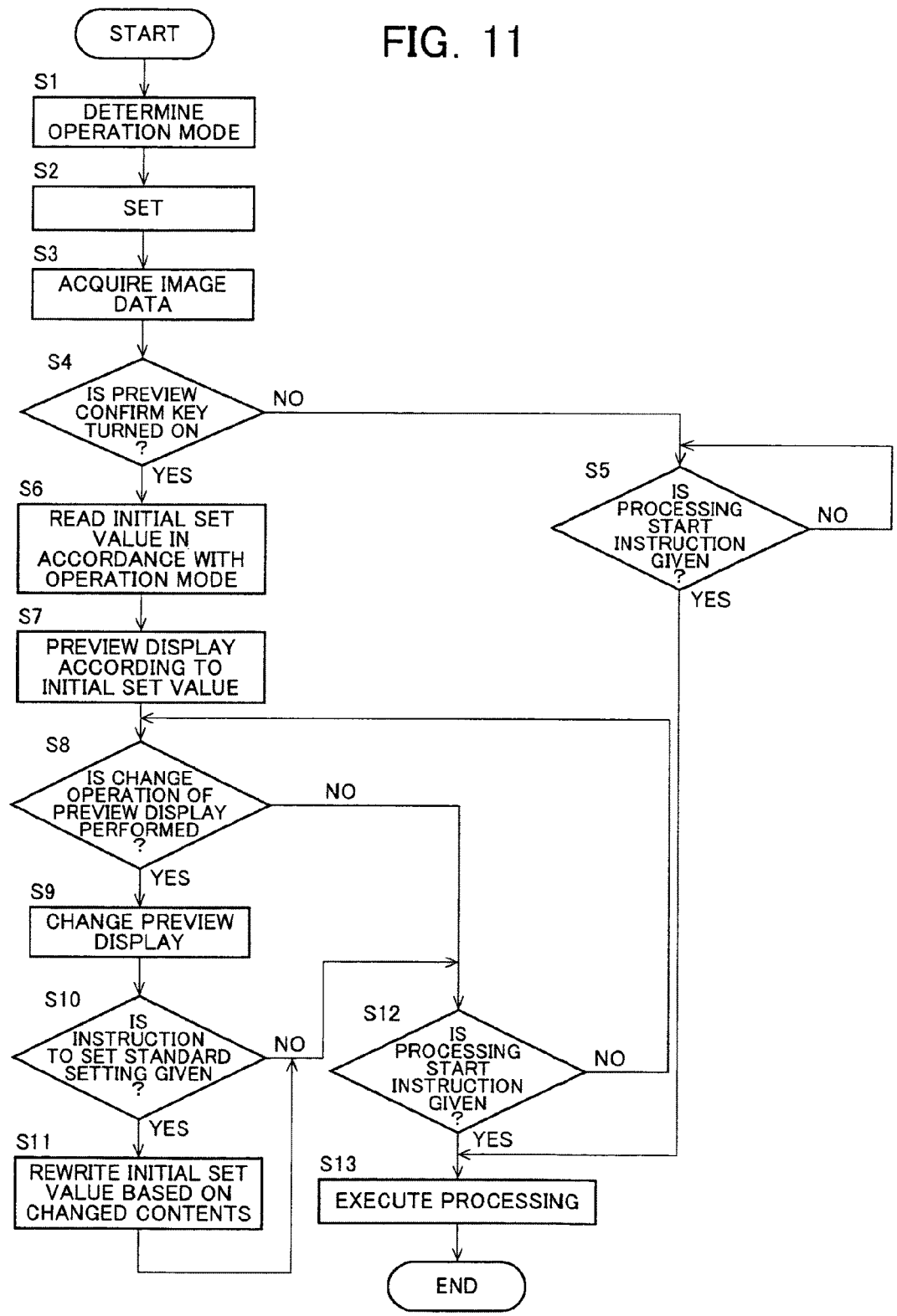
FIG. 11 is a flowchart for explaining an example of procedure for executing a preview display in each operation mode and output processing in the digital multi-functional peripheral of FIGS. 2 and 3.

Next, description will be given for the flow when a preview display in each operation mode and output processing are executed in the digital multi-functional peripheral 1, with reference to FIG. 11. FIG. 11 is a flowchart for explaining an example of procedure for executing a preview display in each operation mode and output processing in the digital multi-functional peripheral of FIGS. 2 and 3.

First, the main control portion 18 determines a current operation mode (step S1), and receives a setting in accordance with the determined operation mode (printing setting in the case of a copy mode, for example) to reflect the setting (step S2). Subsequently, the main control portion 18 acquires image data to be output from the reading portion 13, the image storage portion 15, or the like to provide to the image processing portion 16 (step S3). Then, the main control portion 18 determines whether a setting of the preview confirm key is performed, that is, whether the preview confirm key is turned on (step S4). The determination is to determine whether the preview confirm key 45 of FIG. 4 is operated by a user before output processing such as a copy is started.

In the case of NO at step S4, selection of an output processing start key in accordance with the operation mode, such as a copy start key, a send start key or a save start key, is waited (step S5), and the output processing is executed at the time when an output start instruction is received by the selection.

On the other hand, in the case of YES at step S4, steps S5 to S12 are executed to display a preview image of the acquired image data. To explain specifically, first, the main control portion 18 reads a display set value (initial set value) in accordance with the current operation mode from the control memory 19 (step S6). Then, the preview image generating portion 16a decides a display reducing ratio based on the display set value to generate a preview image, and the panel control portion 11 decides a display position based on the display set value to display the generated preview image in a state of being incorporated in a GUI image on the touch panel 32 (step S7).

The main control portion 18 determines whether or not a changing operation of the preview display is received by the panel control portion 11 (step S8), and when there is no changing operation, selection of the output processing start key in accordance with the operation mode, such as a copy start key, a send start key or a save start key, is waited (step S12), and the output processing is executed at the time when an output start instruction is received by the selection (step S13). In the case of NO at step S12, the procedure returns to step S8 to determine whether the changing operation is performed.

In the case of YES at step S8, the preview image generating portion 16a and the panel control portion 11 change the preview display based on the changing operation (step S9), and the main control portion 18 determines whether or not the standard setting key 73 is selected in the panel control portion 11, that is, whether or not an instruction to cause the changed preview display to have the standard setting is given (step S10). When the instruction is not given, the procedure proceeds to step S12. On the other hand, when the instruction is given, the main control portion 18 rewrites the display set value (initial set value) in the current operation mode based on the changed contents of the preview display in the control memory 19 and the procedure proceeds to step S12.

Although description has been given for the image forming apparatus according to the present invention with reference to the digital multi-functional peripheral 1, as described in the flow of processing thereof, the present invention may employ a form as a preview display method in the image forming apparatus (illustrated as the above-described digital multi-functional peripheral 1) capable of operating in each of a plurality of operation modes. The digital multi-functional peripheral 1 is provided with the set value storage portion that stores a display set value in displaying a preview image first for each operation mode and the image display portion as described above.

The preview display method according to the present invention is provided with: a step of reading a display set value corresponding to a current operation mode from a set value storage portion; and a step of displaying a preview image of image data to be output on an image display portion according to the read display set value. Note that, an application example of the preview display method is as described in the preview display processing in the digital multi-functional peripheral 1, with description thereof omitted.

According to the present invention, the following effect may be obtained.

According to the present invention, it is possible to, in displaying a preview of image data to be output, confirm a confirmation point in accordance with an operation mode immediately without performing a user operation such as enlarging, reducing or shifting.

The invention claimed is:

1. An image forming apparatus configured to operate in each of a plurality of operation modes, comprising:
an image display portion that displays a preview image of image data to be output; and
a set value storage portion that stores a display set value corresponding to the preview image that is initially displayed on the image display portion for each of the operation modes, the display set value being varied for each of the operation modes, such that the preview image initially displayed in each of the operation modes is different, and in a copy mode includes a finish state together with the preview image, whereas in a data send mode includes an image of header information together with the preview image,
wherein the preview image is displayed on the image display portion together with an additional information adjustment key for adjusting an adding position of the header information or other additional information, and after an adjustment is performed, a standard setting key is displayed instead of the adjustment key in order to rewrite the display set value.

2. The image forming apparatus as defined in claim 1, wherein the preview image is an image generated by reducing the image data to be output.

3. The image forming apparatus as defined in claim 1, wherein the preview image is an image in which the image data to be output is sequentially displayed in the unit of a page to be output.

4. The image forming apparatus as defined in claim 1, wherein the copy mode in which image data obtained by reading an original image is printed is included as one of the plurality of operation modes, and the display set value for the copy mode includes a setting by which a display size of the preview image is such a size that the entire page is viewable.

5. The image forming apparatus as defined in claim 4, wherein the display set value for the copy mode includes a setting by which the image display portion displays the preview image including the finish state in outputting.

6. The image forming apparatus as defined in claim 5, wherein the finish state is a state after any one or more of stapling, punching, combination and booklet stapling.

7. The image forming apparatus as defined in claim 1, wherein the copy mode in which image data obtained by reading an original image is printed is included as one of the plurality of operation modes, and the display set value for the copy mode includes a setting by which additional information to be added to the image data in printing is displayed at a substantially intermediate position between an upper end and a lower end of a screen of the image display portion.

8. The image forming apparatus as defined in claim 1, wherein the data send mode in which image data is sent to an outside is included as one of the plurality of operation modes, and the display set value for the data send mode includes a setting by which a covering letter to be attached in sending to the outside or the header information to be added to image data sent to the outside is displayed in a viewable size.

9. The image forming apparatus as defined in claim 1, wherein a filing mode in which image data is stored in a storage apparatus provided inside the image forming apparatus is included as one of the plurality of operation modes, and the display set value for the filing mode includes a setting by which additional information to be added to the image data in storing is displayed at a substantially intermediate position between an upper end and a lower end of the screen of the image display portion.

10. The image forming apparatus as defined in claim 1, wherein the display set value includes a setting by which a display magnification of the preview image of the image data to be output is differentiated in accordance with the operation modes.

11. The image forming apparatus as defined in claim 1, wherein a set value changing portion is included for changing the display set value in accordance with the operation modes by a user operation.

12. The image forming apparatus as defined in claim 11, wherein a user authenticating portion for authenticating a user is included, the set value storage portion is capable of storing the display set value in accordance with the operation modes for each user authenticated by the user authenticating portion, and the set value changing portion is capable of changing the display set value in accordance with the operation modes for each user authenticated by the user authenticating portion.

13. A preview display method in an image forming apparatus configured to operate in each of a plurality of operation modes, wherein
the image forming apparatus includes a set value storage portion that stores a display set value corresponding to a preview image that is initially displayed for each of the operation modes and an image display portion, the display set value being varied for each of the operation modes, such that the preview image in each of the operation modes is different, and in a copy mode includes a finish state together with the preview image, whereas in a data send mode includes an image of header information together with the preview image, the preview image display method comprising:

a step of reading the display set value corresponding to a current operation mode from the set value storage portion; and a step of displaying the preview image of image data to be output on the image display portion according to the read display set value, wherein the preview image is displayed on the image display portion together with an additional information adjustment key for adjusting an adding position of the header information or other additional information, and after an adjustment is performed, a standard setting key is displayed instead of the adjustment key in order to rewrite the display set value.

* * * * *